United States Patent
Kaneda et al.

(10) Patent No.: US 7,013,082 B2
(45) Date of Patent: Mar. 14, 2006

(54) OPTICAL APPARATUS AND LENS APPARATUS

(75) Inventors: Naoya Kaneda, Kanagawa (JP); Hidekazu Nakamura, Tochigi (JP); Koji Sato, Fukushima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/153,627

(22) Filed: Jun. 14, 2005

(65) Prior Publication Data

US 2005/0232618 A1    Oct. 20, 2005

Related U.S. Application Data

(63) Continuation of application No. 10/691,156, filed on Oct. 21, 2003, now Pat. No. 6,954,313.

(30) Foreign Application Priority Data

| | | |
|---|---|---|
| Oct. 22, 2002 | (JP) | ............................ 2002-306606 |
| Jan. 31, 2003 | (JP) | ............................ 2003-025085 |
| Jan. 31, 2003 | (JP) | ............................ 2003-025176 |

(51) Int. Cl.
  *G03B 13/34* (2006.01)
  *G03B 17/00* (2006.01)
  *G02B 15/14* (2006.01)
  *G02B 7/04* (2006.01)

(52) U.S. Cl. ........................ 396/85; 396/131; 359/696; 359/823

(58) Field of Classification Search ............ 396/85–87, 396/131, 148, 79–83; 359/696–698, 822–826
See application file for complete search history.

(56) References Cited

U.S. PATENT DOCUMENTS

| | | | | |
|---|---|---|---|---|
| 4,008,951 | A | * | 2/1977 | Himmelsbach ............. 359/696 |
| 4,748,509 | A | * | 5/1988 | Otake et al. ................ 348/347 |
| 5,150,143 | A | * | 9/1992 | Ohno et al. .................. 396/60 |

FOREIGN PATENT DOCUMENTS

| | | |
|---|---|---|
| JP | 6-186467 A | 7/1994 |
| JP | 9-304679 A | 11/1997 |
| JP | 10-191141 A | 7/1998 |

* cited by examiner

*Primary Examiner*—W. B. Perkey
(74) *Attorney, Agent, or Firm*—Morgan & Finnegan, L.L.P.

(57) ABSTRACT

An optical apparatus is disclosed with which the correspondence between the movement of a movable lens and the position of an operating member can be maintained and the operability can be improved. The optical apparatus comprises a lens drive unit which drives a movable lens, an operating member operable within a predetermined movable range, and an operating member drive unit which drives the operating member within the predetermined movable range. The optical apparatus also comprises an operating member position detector detecting the position of the operating member, and a signal output unit that outputs a signal for moving the movable lens. The controller controls the drive of the lens drive unit based on a signal from the operating member position detector and controls the drive of the operating member drive unit based on the signal from the signal output unit.

9 Claims, 20 Drawing Sheets

OPTICAL APPARATUS AND LENS APPARATUS this application is a continuation of U.S. application Ser. No. 10/691,156 filed Oct. 21, 2003, now U.S. Pat. No. 6,954,313.

BACKGROUND OF THE INVENTION

1. Field of the Invention

The present invention relates to an optical apparatus, such as a digital camera, video camera, etc., having an integral lens, and an interchangeable lens apparatus that can be mounted to such a camera.

2. Description of the Related Art

A so-called rear focus (inner focus) zoom lens, having a variable power lens, and a focus lens which is positioned at the image plane side of the variable power lens and performs focusing and compensation of the image plane variation that accompanies the movement of the variable power lens (function of a compensator), is provided integrally in a digital camera, video camera, or other image-taking apparatus or is used as an interchangeable lens.

For example, with a lens apparatus that uses an above-described rear focus zoom lens of an interchangeable type, focus adjustment is performed by driving the focus lens based on a focus drive signal from the camera side. Also, zooming is performed by driving the variable power lens based on a zoom drive signal resulting from the operation of a zoom switch provided at the camera and driving the focus lens so as to compensate for the image plane variation that accompanies the power variation.

Here, in order to improve the operability for image taking, image-taking apparatuses and lens apparatuses of structures with which an operator performs focusing and zooming operation by manual operation, have been proposed.

In Japanese Patent Application Laid-open No. H6 (1994)-186467, an image-taking apparatus with a structure using an optical system of the above-described rear focus zoom type and enabling manual focusing is proposed. In this image-taking apparatus, a focus lens drive motor is driven in accordance with the rotation operation of a manual focus ring to move a focus lens. Also, when the focus lens is moved during an autofocus action, the manual focus ring is rotated by a motor.

A method for indicating the distance to an object by means of a printing of distance indications on the outer circumference of the manual focus ring and a mark on a fixed part is also proposed in this Publication.

An image-taking apparatus with a structure using an optical system of the rear focus zoom type and enabling manual focus operation is also proposed in Japanese Patent Application Laid-open No. H10 (1998)-191141. In this image-taking apparatus, a manual zoom lever is operated rotatingly and a zoom lens is moved in accordance with this rotating operation. Also, the manual zoom lever is rotated by a motor when the zoom lens is moved by operation of a zoom key at the camera.

A method for indication of focal lengths by means of a scale for focal lengths on a fixed part near the manual zoom lever is also proposed in this Publication.

In Japanese Patent Application Laid-open No. H9 (1997)-304679, an image-taking apparatus with a structure, which uses an optical system of the above-described rear focus zoom type, enables manual zooming or manual focusing, and with which the driving force of a motor is transmitted via a clutch mechanism to a manual ring, is proposed. In this image-taking apparatus, selection between manual operation and motor drive of the manual ring is enabled by switching the clutch mechanism.

However, in the image-taking apparatus proposed in the above-described Japanese Patent Application Laid-open No. H6 (1994)-186467, there is the problem that during the autofocus action, the correspondence between the position to which the focus lens is moved and the position to which the manual focus ring is moved (rotated) by motor drive is not matched (not maintained).

Also, in the image-taking apparatus proposed in the above-described Japanese Patent Application Laid-open No. H10 (1998)-191141, there is the problem that during movement of the zoom lens by operation of the zoom key, the correspondence between the position to which the zoom lens is moved and the position to which the manual zoom lever is moved (rotated) by motor drive is not matched (not maintained).

Generally, with a manual operating member (manual focus ring, manual zoom ring, etc.), a viscous material, such as grease, etc., is provided between the manual operating member and a fixed member so that an operator is provided with a predetermined operating sensation (rotational torque). However, with a temperature change, the viscosity of this viscous material varies, the load varies accordingly, and thus the movement (rotation) speed of the manual operating member varies to give rise to the above-described problems.

Also, if during movement of the focus lens by the autofocus action or movement of the zoom lens by the zoom key operation, the movement of the manual operating member (ring or lever) is restrained by the operator, the movement (rotation) of the manual operating member will be limited. The problem that the correspondence between the position to which the focus lens or zoom lens is moved and the position of the manual operating member is not matched (is not maintained) occurs in this case as well.

Likewise with the image-taking apparatus proposed in the above-described Japanese Patent Application Laid-open No. H9 (1997)-304679, there is the problem that the correspondence between the position to which the focus lens or the zoom lens is moved by autofocusing or zoom key operation and the manual ring is not matched.

In the image-taking apparatus proposed in the above-described Japanese Patent Application Laid-open No. H9 (1997)-304679, in the state in which the clutch mechanism is switched to the manual operation side, that is, in the state in which the driving force is not transmitted to the manual ring, the lens will not move even if the motor is driven for autofocusing or for zooming in accordance with a zoom key operation. The motor thus practically idles (the motor rotates without the driving force being transmitted to the manual ring) and power (battery) is consumed wastefully. Moreover, an operator may not notice that the clutch mechanism is switched to the manual operation side and may not be able to perform image taking as desired.

Furthermore, if an operator operates the manual ring manually when the clutch is switched to the motor drive side, the operation of the manual ring will be heavy due to the application of the rotational load of the motor. However, the operability may be lowered if the operator has to switch to the manual operation side manually by the clutch mechanism each time to obtain a good operation sensation.

For the problem that the correspondence between the lens position and the position to which an operating member is moved (rotated) by motor drive is not matched, a method, wherein a position detector is provided for detecting the position of the manual ring, information indicating the respective positions within the movement (rotation) range of the manual ring are stored in a microcomputer in advance during an initial setting step prior to the start of image taking, etc., and positional control of the lens is performed so as to correspond with these position information, may be considered.

However, if a potentiometer, etc., is used as the position detector for detecting the position of the manual ring, since the output voltage from the position detector will vary due to the temperature drift phenomenon, deviation may occur between the position of the manual ring stored during initial setting and the actual position of the manual ring. In this case, the focal length and the in-focus distance indicated by the manual ring may deviate from the actual focal length and in-focus distance of the optical system.

SUMMARY OF THE INVENTION

An object of the present invention is to provide an optical apparatus and a lens apparatus, with which the correspondence between the movement of a movable lens and the movement of an externally operated operating member can be maintained and with which the operability can be improved.

In order to achieve the above object, a first aspect of the present invention comprises a movable lens, movable in an optical axis direction, a lens drive unit which drives the movable lens, an operating member operable within a predetermined movable range, and an operating member drive unit which drives the operating member within the predetermined movable range. This first aspect also comprises an operating member position detector which outputs a signal for detecting the position of the operating member, a signal output unit (or camera) which outputs a signal for moving the movable lens, and a controller which controls the drive of the lens drive unit and the operating member drive unit. Here, the controller controls the drive of the lens drive unit based on the signal from the operating member position detector and controls the drive of the operating member drive unit based on the signal from the signal output unit (or camera).

Also, a second aspect of the present invention comprises a movable lens movable in an optical axis direction, a lens drive unit which drives the movable lens, an operating member operable within a predetermined movable range, and an operating member drive unit which drives the operating member within the predetermined movable range. This second aspect also comprises an operating member position detector which outputs a signal for detecting the position of the operating member, a signal output unit (or camera) which outputs a first signal and a second signal, each of which is a signal for moving the movable lens, and a controller which controls the drive of the lens drive unit and the operating member drive unit. The controller controls the drive of the lens drive unit based on the signal from the operating member position detector, controls the drive of the operating member drive unit based on the first signal, and furthermore controls the drive of the lens drive unit based on the second signal.

Also, a third aspect of the present invention comprises a movable lens movable in an optical axis direction, a lens drive unit which drives the movable lens, an operating member operable within a predetermined movable range, and an operating member drive unit which drives the operating member within the predetermined movable range. This third aspect also comprises an operating member position detector which outputs a signal for detecting the position of the operating member, a signal output unit (or camera) which outputs a signal for moving the movable lens, and a controller which controls the drive of the lens drive unit based on the signal from the operating member position detector and controls the drive of the operating member drive unit based on the signal from the signal output unit (or camera). This third aspect furthermore comprises a switching mechanism switchable between a transmitting state, in which a drive force is transmitted from the operating member drive unit to the operating member, and a non-transmitting state, in which the drive force is not transmitted, and a switching detector which outputs a signal for detecting the state of the switching mechanism. The controller controls the drive of the operating member drive unit based on the signal from the signal output unit (or camera) when the switching mechanism is detected to be in the transmitting state by the signal from the switching detector, and restricts the drive of the operating member drive unit based on the signal from the signal output unit (or camera) (for example, does not perform drive of the operating member drive unit or automatically switches the switching mechanism to the transmitting state and then performs drive of the operating member drive unit) when the switching mechanism is detected to be in the non-transmitting state.

Also, a fourth aspect of the present invention comprises a movable lens movable in an optical axis direction, a lens drive unit which drives the movable lens, an operating member operable within a predetermined movable range, and an operating member drive unit which drives the operating member within the predetermined movable range. This fourth aspect also comprises an operating member position detector which outputs a signal for detecting the position of the operating member, a signal output unit (or camera) which outputs a signal for moving the movable lens, and a controller which controls the drive of the lens drive unit based on the signal from the operating member position detector and controls the drive of the operating member drive unit based on the signal from the signal output unit (or camera). This fourth aspect furthermore comprises a switching mechanism switchable between a transmitting state, in which a drive force is transmitted from the operating member drive unit to the operating member, and a non-transmitting state, in which the drive force is not transmitted, a switching detector which outputs a signal for detecting the state of the switching mechanism, and a switching drive unit which actuates the switching mechanism to switch between the transmitting state and the non-transmitting state. When the switching mechanism is detected to be in the transmitting state by the signal from the switching detector and there is a change in the signal from the operating member position detector while the operating member drive unit is not driven, the controller drives the switching drive unit to switch the switching mechanism from the transmitting state to the non-transmitting state.

Also, a fifth aspect of the present invention comprises a movable lens movable in an optical axis direction, a lens drive unit which drives the movable lens, an operating member operable within a predetermined movable range, and an operating member drive unit which drives the operating member in the predetermined range. This fifth aspect also comprises an operating member position detector which outputs a signal for detecting the position of the operating member, and a signal output unit (or camera) which outputs a signal for moving the movable lens. The fifth aspect furthermore comprises a memory which stores information indicating the correspondence between the position of the operating member and the position of the movable lens, and a controller which controls the drive of the lens drive unit based on the position information on the operating member detected by the signal from the operating member position detector and the correspondence information stored in the memory. The controller also controls the drive of the operating member drive unit based on the signal from the signal output unit (or camera). The fifth aspect furthermore comprises an end position detector which outputs a signal for detecting that the operating member is positioned at an optical end corresponding position that is set at the inner side of the predetermined movable range. The controller corrects the correspondence information based on the position information on the operating member at the time the operating member has been detected to be positioned at the optical end corresponding position by the signal from the end position detector.

Also, a sixth aspect of the present invention comprises a movable lens movable in an optical axis direction, a lens drive unit which drives the movable lens, an operating member operable within a predetermined movable range, and an operating member drive unit which drives the operating member. This sixth aspect also comprises an operating member position detector which outputs a signal for detecting the position of the operating member, and a signal output unit (or camera) which outputs a signal for moving the movable lens. The sixth aspect furthermore comprises a memory which stores information indicating the correspondence between the position of the operating member and the position of the movable lens, and a controller which controls the drive of the lens drive unit based on the position information on the operating member detected by the signal from the operating member position detector and the correspondence information stored in the memory. The controller also controls the drive of the operating member drive unit based on the signal from the signal output unit (or camera). The sixth aspect furthermore comprises an end position detector which outputs a signal for detecting that the operating member is positioned at an optical end corresponding position that is set at the inner side of the predetermined movable range. The controller corrects the position information on the operating member that is used in controlling the drive of the lens drive unit based on the position information on the operating member that is detected at the time the operating member has been detected to be positioned at the optical end corresponding position by the signal from the end position detector.

The characteristics of the present invention's optical apparatus and lens apparatus shall become more clear by the following description of specific embodiments in reference to the drawings.

DESCRIPTION OF THE PREFERRED EMBODIMENTS

Embodiments of the present invention shall now be described with reference to the drawings.

(Embodiment 1)

Figure 1:
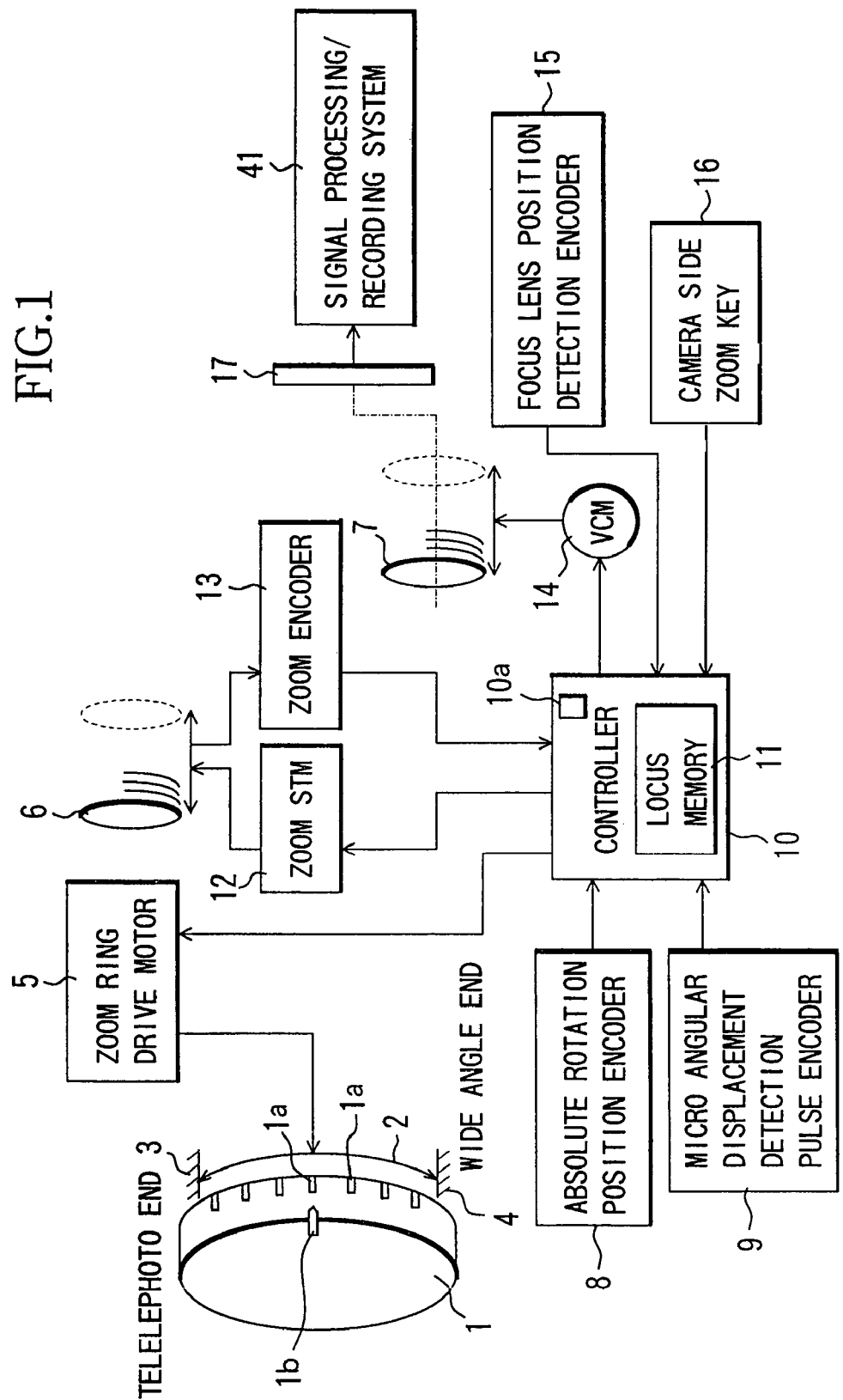
FIG. 1 is a block diagram showing the structure of an optical apparatus of Embodiment 1 of the present invention.

FIG. 1 is a block diagram for describing Embodiment 1 of an optical apparatus of the present invention and shows Embodiment wherein the present invention is applied to a zoom mechanism of a digital still camera, video camera, or other image-taking apparatus equipped with a rear focus zoom lens optical system. Here, the rear focus zoom lens optical system of this embodiment comprises a variable power lens (variator lens), and a focus lens which is positioned at the image plane side of the variator lens, moves in an optical axis direction so as to compensate the image plane variation that accompanies a magnification changing action (zooming) of the variator lens (action of a compensator), and moves in the optical axis direction for focusing. This optical system which is an image-taking lens is, for example, a 4-unit rear focus zoom type optical system that is structured from a fixed positive first lens unit, a negative second lens unit which moves with the magnification changing action, a fixed positive third lens unit and a positive fourth lens unit, which moves for the compensator action and for focusing. In FIG. 1, the variator lens unit and the focus lens unit are illustrated and the other lens units are omitted from illustration.

In FIG. 1, Reference numeral 1 shows a zoom ring, which is an operating member that is manually operated from the exterior. Reference numeral 2 shows arrows that indicate the rotation angle (movable range) of the zoom ring 1, and the rotation range of the zoom ring 1 is set by a stopper which is omitted from illustration, and the zoom ring 1 thus rotates between a telephoto end 3 at which the focal length (zoom position) will be the longest focal length, and a wide angle end 4 at which the focal length will be the shortest focal length. The rotation angle (movable range) of the zoom ring 1 is set within a range, for example, of approximately 90° to 120°.

The zoom ring 1 is also provided, by printing, stamping, etc., with a focal length scale 1a. The current focal length is indicated by the focal length scale 1a being matched with a mark 1b that is provided on a fixed lens barrel (not shown) that rotatably supports the zoom ring 1.

Reference numeral 5 shows a motor that drives the zoom ring 1, and a step motor or a DC motor, etc., is used as this motor. Reference numeral 6 shows a variator lens unit which moves in the optical axis direction for changing magnification, and Reference numeral 7 shows a focus lens unit disposed at the image plane side of the variator lens unit 6. Reference numeral 8 shows an absolute rotation position encoder that outputs a signal for detecting the absolute rotation position of the zoom ring 1.

Reference numeral 9 shows a micro angular displacement detection pulse encoder, which is provided as necessary in a case where the resolution of the absolute rotation position encoder 8 is insufficient and outputs a signal for detecting the micro rotation angle of the zoom ring 1.

Reference numeral 10 shows a controller structured from a CPU or MPU, etc., and Reference numeral 11 shows a locus memory which is provided in the controller 10 and stores data concerning zoom tracking. Reference numeral 12 shows a zoom motor which drives the variator lens unit 6 in the optical axis direction, and though "STM" is indicated in presumption of a stepping motor, this may, for example, be a voice coil motor or other linear actuator, etc., instead. Reference numeral 13 shows a zoom encoder which detects the absolute position in the optical axis direction of the variator lens unit 6, and Reference numeral 14 shows a motor, which drives the focus lens unit 7. Here, though "VCM" (voice coil motor) is indicated in presumption of a linear actuator, a step motor, etc., may be used instead.

Reference numeral 15 shows an encoder which detects the absolute position in the optical axis direction of the focus lens unit 7. Reference numeral 16 shows a zoom key provided in the camera body and is structured as a seesaw switch, etc., which is operated in two different directions. The zoom key 16 outputs a zoom drive signal in accordance with the operation, and returns to a neutral position when not being operated.

Reference numeral 17 shows an image pickup element, such as a CCD, CMOS sensor, etc., and photoelectrically converts an optical image that is formed by the above-described optical system and outputs the image signal to a signal processing system/recording system 41.

As the above-described absolute rotation position encoder 8, for example, a structure, wherein a multi-rotation type potentiometer is coupled and driven via a gear train by an inner gear provided in the zoom ring 1, may be employed. A structure, wherein the rotation of the zoom ring 1 is converted to rectilinear movement and coupled with a linear type potentiometer, is also possible. A structure having a circuit, which, after the zoom ring 1 is positioned at a priorly determined starting position, continuously counts the pulses generated from the pulse encoder due to rotation of the zoom ring 1 and thereby outputs position information on (a signal for detecting the position of) the zoom ring 1, may also be used.

In the following, a description shall be provided for the case where the absolute rotation position encoder 8 is of this type that outputs position information.

In a case where a stepping motor is used as the drive source, each of the zoom encoder 13 and the focus lens position detection encoder 15 may be a pulse counting type encoder having a structure with which, after the lens unit is positioned at a predetermined starting position based on an output change of an unillustrated start position switch (reset switch), the drive pulses of the step motor are counted continuously to output position information corresponding to the position (a signal for detecting the position) of the lens unit.

Also, an encoder may be structured with a magnetic scale that is long in the optical axis direction and a fixed magnetic sensor so that a signal (signal for detecting the position) is output in accordance with the magnetic variation due to movement of the lens unit. In the following, a description shall be provided with these encoders 13 and 15 being of the above-described type that outputs position information.

The actions of the optical apparatus of the above-described embodiment shall now be described.

First, a case where an operator performs a manual zooming operation shall be described.

When an operator rotates the zoom ring 1, position information (information indicating the movement amount or the movement position) on the zoom ring 1 is output from the absolute rotation position encoder 8. This position information is transmitted to the controller 10. At the controller 10, the rotation position of the zoom ring 1 is detected based on this position information. The controller 10 then moves the position of the variator lens unit 6 to an optimal position (the new focal length indicated by the zoom ring 1) using the information of the zoom encoder 13 and using the zoom motor 12 so as to follow with (correspond to) the position of the zoom ring 1. At the same time, for a zoom tracking operation (compensation of the image plane variation that accompanies the magnification changing movement), the focus lens unit 7 is likewise driven by the encoder 15 and the motor 14 and based on the information in the locus memory 11 to a position at which the in-focus state will be maintained. The state in which zooming operation of the optical system (movement of the variator lens unit 6 and focus lens unit 7) is performed to a position corresponding to the position of the zoom ring 1 is thus attained.

As the zoom motor 12 and focus motor 14, motors or actuators of specifications enabling high-speed movement of the lens units are preferably selected so that the zoom ring 1 can be followed even when it is rotated at high speed. Also, the zoom ring 1 may be structured with the rotational torque being controlled to a suitable value by grease, etc., so that a suitable resisting sensation (good operating sensation for manual operation) will be provided and operation of excessively high speed will be prevented.

Next, a case where the zoom key 16 is operated (power zoom operation) shall be described.

When the zoom key 16 is operated by operation of the operator, the controller 10 drives the zoom ring drive motor 5 in accordance with the operation of the zoom key 16. For example, if an instruction to zoom in the wide angle to telephoto direction at the fastest speed (a plurality of speed settings may be set in accordance with the pressing amount of the zoom key 16) is provided to the controller 10 from the zoom key 16 and the zoom ring drive motor 5 is a stepping motor, the motor is driven at a pulse input interval corresponding to the "fastest speed" which is priorly set. In the case of a DC motor, the motor is driven, for example, with the ON/OFF proportion of the application voltage being set to a proportion (for example, ON 100%, OFF 0%) corresponding to the "fastest speed" which is priorly set. Here, the "fastest speed" refers to the maximum speed in the drive control using the motor 5 and is set to an optional speed.

The current rotation position of the zoom ring 1 is detected constantly (at each preset sampling period) by means of the position information from the absolute rotation position encoder 8. The position information from the encoder 8 (information on the current position of the zoom ring) is output to the controller 10. In accordance with the detected rotation position of the zoom ring 1, the controller 10 moves the variator lens unit 6 to the position corresponding to the current position of the zoom ring 1 by means of the zoom motor 12 and the zoom encoder 13. Also at the same time, for the zoom tracking operation (compensator action), the focus lens unit 7 is moved to a suitable position in a tracking manner by the driving of the focus motor 14 and the output of the focus lens position encoder 15.

Here, if the zoom ring 1 for example is held by the operator when the zoom key 16 is operated, the zoom ring drive motor 5 cannot drive even though it attempts to drive (the motor 5 becomes locked or slips due to an unillustrated clutch) and consequently, the zoom ring 1 does not rotate. Since the absolute rotation position encoder 8 detects the position at which the zoom ring 1 did not rotate, the zooming operation is not performed.

Thus with the present embodiment, the focal length indication of the zoom ring 1 and the actual state of the focal length of the image-taking lens can be put constantly in a substantially corresponding state of low deviation so as to enable the focal length to be maintained as it is indicated and in accordance with the intention of the operator.

The operation of the controller 10 in the above-described manual zooming operation and the power zooming operation shall now be described using the flowcharts of FIGS. 2 and 3.

Figure 2:
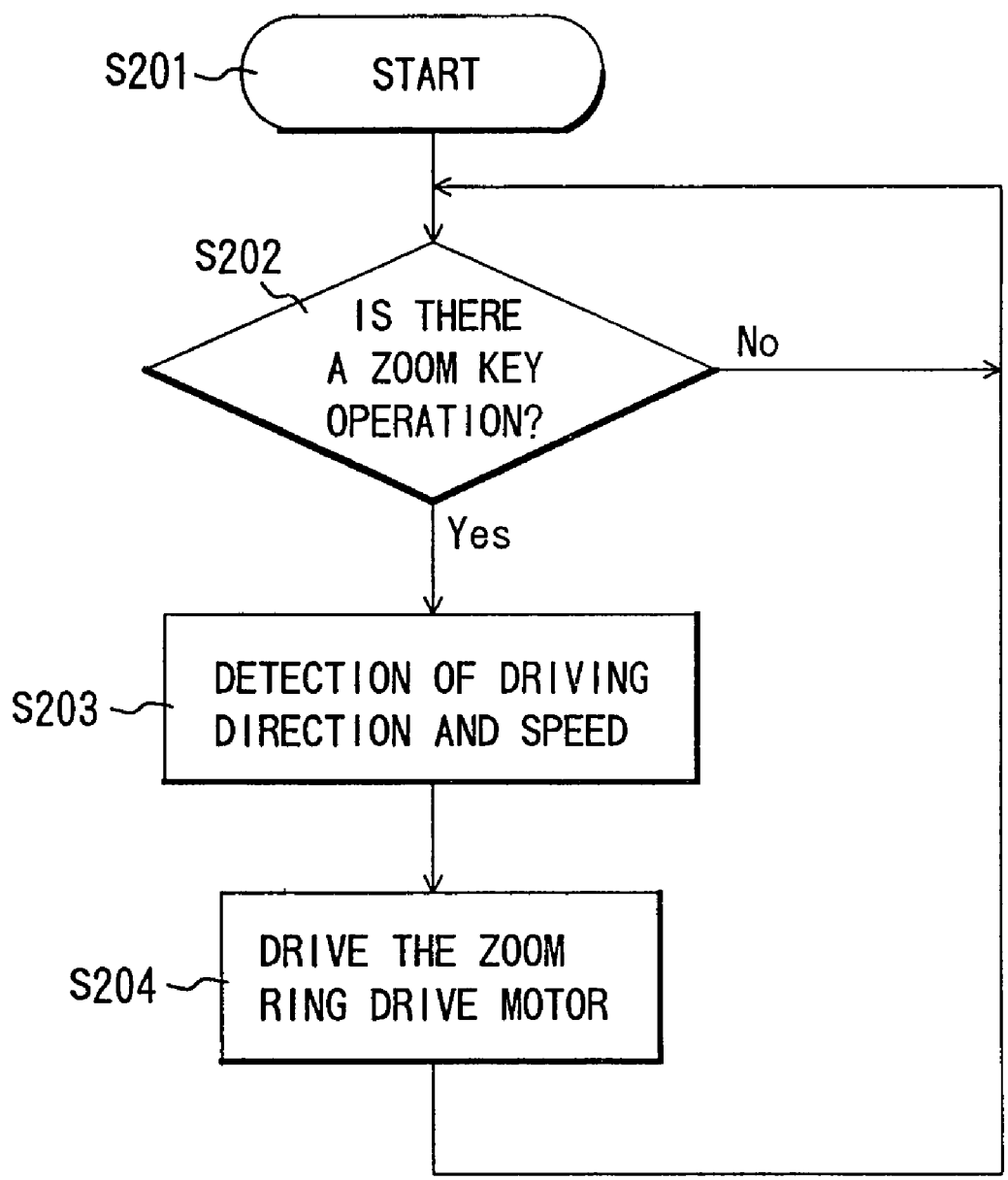
FIG. 2 is a flowchart illustrating the operation of the optical apparatus of Embodiment 1 (and Embodiments 4, 7, 10, and 12).

FIG. 2 is a flowchart showing the operation of the controller 10 during operation of the zoom key 16 (power zoom operation). In FIG. 2, the operation is started in step (indicated as S in the Figure) 201 when the power of the image-taking apparatus, etc., is turned ON, etc.

In step 202, whether or not operation of the zoom key 16 is occurred is detected. In a case of a video camera, this detection is performed at a sampling period (a field period of 1/60 seconds in the case of an NTSC television system and 1/50 seconds in the case of a PAL system, or at a period of even higher rate). When the zoom key 16 is operated, the Yes judgment is made in step 202 and step 203 is entered.

In step 203, the operation direction and speed (operation amount) of the zoom key 16 are detected. In many cases where the zoom key 16 is a seesaw switch, structures are made so that a higher zoom speed is set the deeper the amount by which the key is pressed or the stronger the pressure by which the key is pressed.

In step 204, the zoom ring drive motor 5 is driven in the predetermined direction under the predetermined drive conditions based on the contents detected in step 203.

The operation of the controller 10, which is performed when a zooming operation of moving the variator lens unit 6 and the focus lens unit 7 in accordance with the displacement (movement) of the zoom ring 1 is performed, shall now be described using the flowchart of FIG. 3. The operation of FIG. 3 is performed both in a case where the zoom ring 1 is rotated by the operation of the zoom key 16 (power zoom operation) as described using FIG. 2 and in a case where the zoom ring 1 is operated manually by an operator.

Figure 3:
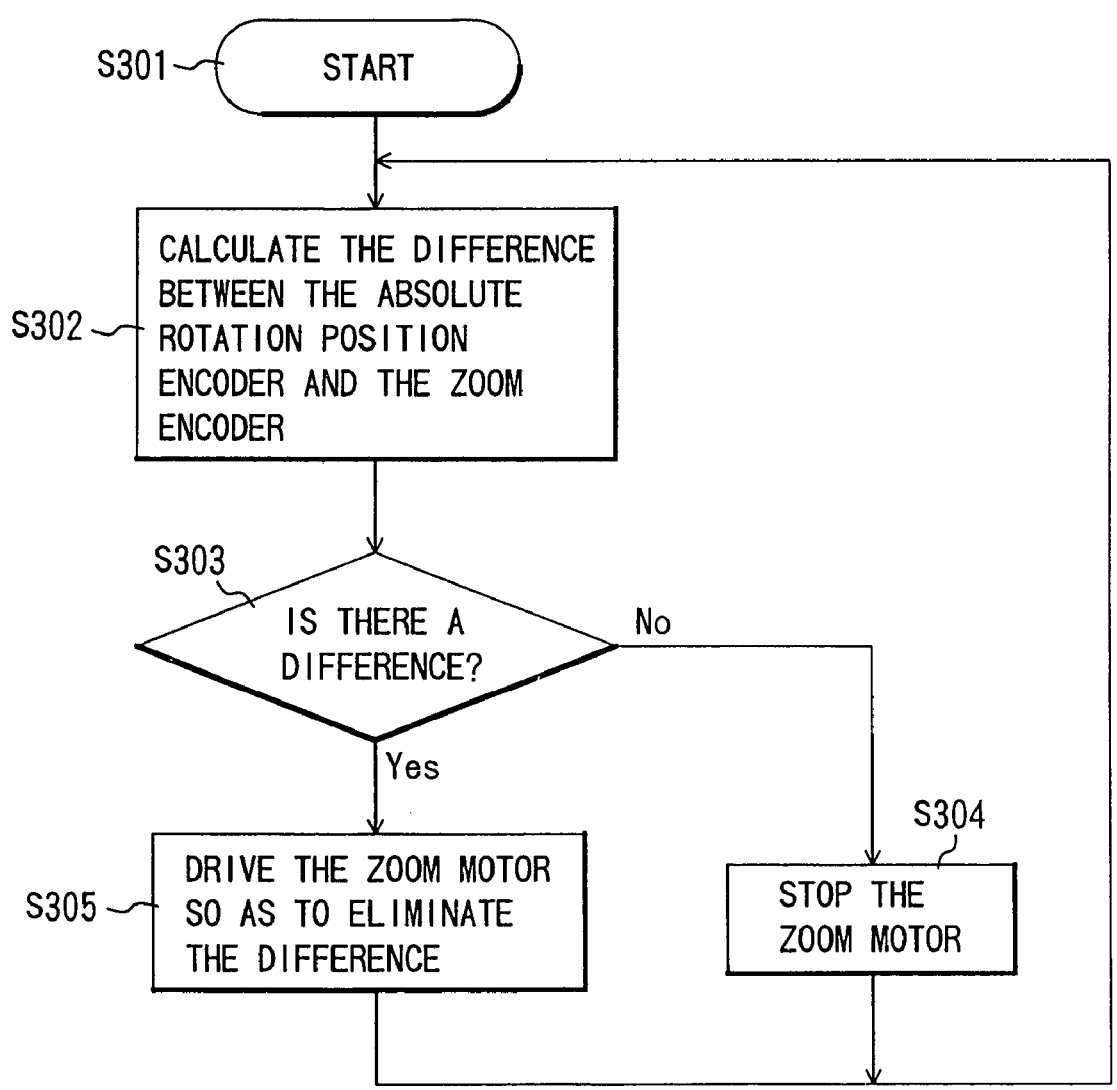
FIG. 3 is a flowchart illustrating the operation of the optical apparatus of Embodiment 1 (and Embodiments 4, 5, 7, 8, 10, and 12).

In FIG. 3, the present operation is started in step 301 when the power of the image-taking apparatus is turned ON, etc., In step 302, the output of the absolute rotation position encoder 8 and the output of the zoom encoder 13 are read as mentioned above at the sampling period and the difference between these outputs is calculated.

Here, the "difference" is the difference between the value (converted position information) resulting from the conversion of the position information from the absolute rotation position encoder 8 to the position information that should be obtained from the zoom encoder 13 and the actual position information that is obtained from the zoom encoder 13. The controller 10 has stored, in advance in a memory 10a inside the controller 10 shown in FIG. 1, data (table data, etc.) or a calculation formula for conversion of the position information from the absolute rotation position encoder 8 to the position information that should be obtained from the zoom encoder 13, in other words, the information indicating the relationship (correspondence) that should hold primarily for the position information of the zoom ring 1 and the position information of the variator lens unit 6.

When the difference between the converted position information and the actual position information from the zoom encoder 13 is zero, that is, when the position information of the absolute rotation position encoder 8 and the position information of the zoom encoder 13 are in the "relationship (correspondence) that should hold", the focal length indication at the zoom ring 1 will be in a state of correspondence with the position of the variator lens unit 106. This means that, for example, when the zoom ring 1 is at the wide angle end position, the focal length of the optical system (the position of the variator lens unit 6) is also at the wide angle end position.

In step 303, it is judged whether the difference calculated in step 302 is zero or within a minute amount corresponding to predetermined dead zones (dead zones in terms of operation that are provided at the ends of the operating range of the zoom ring 1 in accordance with optically allowable errors or dead zones in terms of detection of the encoders 8 and 13, etc.), or there is a difference. When the difference is zero or within the minute amount, step 304 is entered and the zoom motor 12 is stopped.

When the difference is not zero or exceeds the minute amount in step 303, step 305 is entered and the zoom motor 12 is driven so that this difference becomes zero or falls within the minute amount. At the same time, for the zoom tracking operation (compensator action), the focus lens unit 7 is moved to an appropriate position in a tracking manner by using the focus motor 14 and the focus lens position encoder 15. The state in which zooming operation of the optical system (movement of the variator lens unit 6 and focus lens unit 7) is carried out to a position that corresponds to the position of the zoom ring 1 is thus attained.

Since the operation of the flowchart shown in FIG. 3 is performed constantly (at the sampling period), it is carried out when the zoom ring 1 is rotated by operation of the zoom key 16 and by manual operation by the operator. Also, even if the zoom key 16 or the zoom ring 1 is not operated, this operation is performed immediately when the position information of the absolute rotation position encoder 8 and the position information of the zoom encoder 13 deviates from the "relationship that should hold."

Thus with this embodiment, the optical system (variator lens unit 6 and focus lens unit 7) is put in the state where it is positioned by zooming operation at a position corresponding to the position of the zoom ring 1. The focal length indication of the zoom ring 1 and the state of the actual focal length of the optical system can thus be put constantly in a substantially corresponding state of low deviation so as to enable the focal length to be maintained as it is indicated.

(Embodiment 2)

Figure 4:
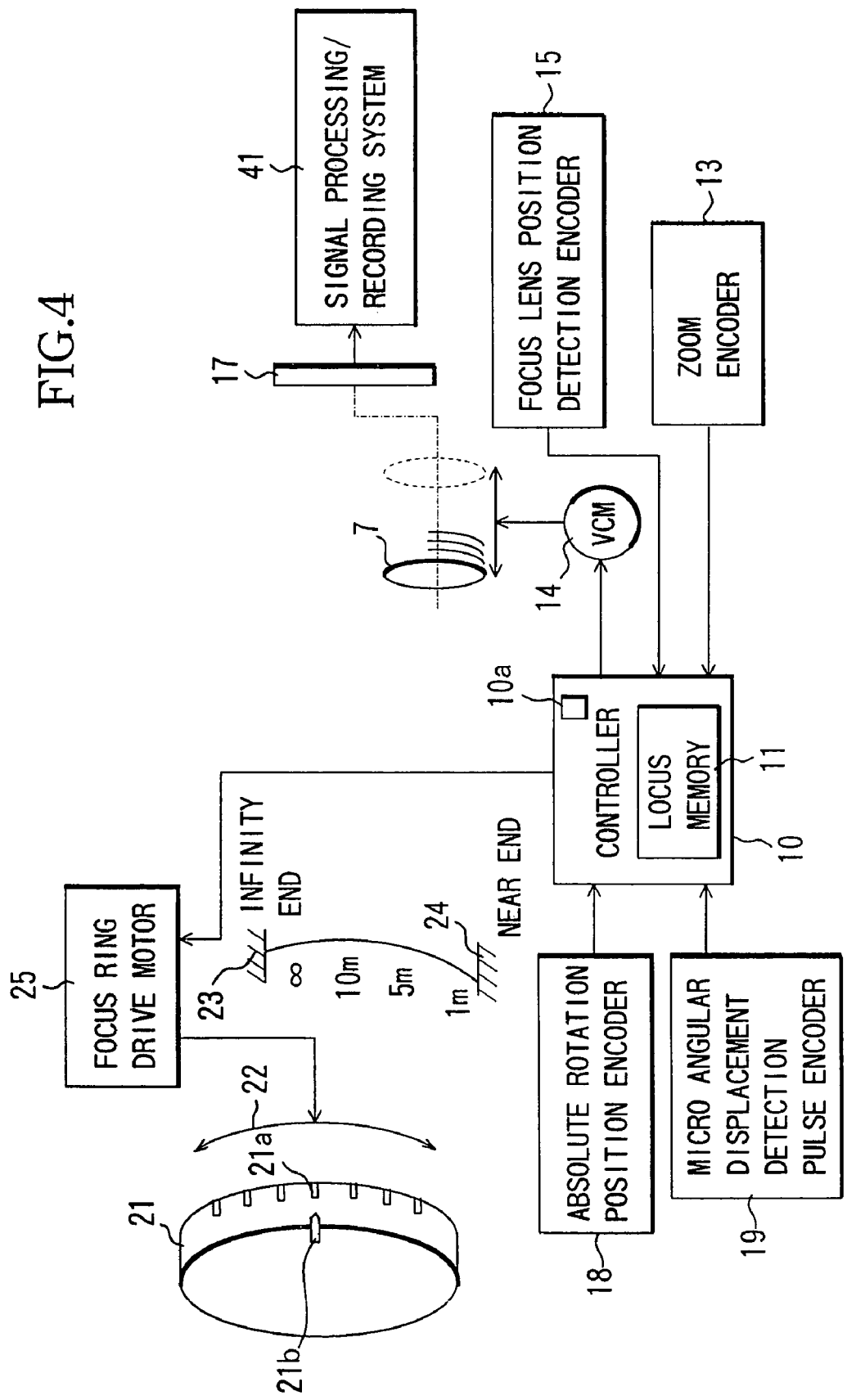
FIG. 4 is a block diagram showing the structure of an optical apparatus of Embodiment 2 of the present invention.

FIG. 4 is a block diagram for describing Embodiment 2 of an optical apparatus of the present invention and shows Embodiment wherein the invention is applied to a focus mechanism of a digital still camera, video camera, or other image-taking apparatus equipped with a rear focus zoom lens optical system. The 4-unit rear focus zoom type optical system described with FIG. 1 is also applied in the present embodiment. However in FIG. 4, the focus lens unit is illustrated and the other lens units are omitted from illustration. In FIG. 4, the components that are the same as those of FIG. 1 are provided with the same Reference numerals and description thereof shall be omitted.

In FIG. 4, Reference numeral 21 shows a focus ring which is an operating member that is manually operated rotatingly by an operator. Like the zoom ring 1 of FIG. 1, the focus ring 21 rotates within a rotation angle range (movable range) 22 and is provided with an infinity end 23 and a near (minimum object distance) end 24. Like the zoom ring 1, a distance scale 21a, indicating, for example, 8, 10 m, 5 m, 1 m, etc., is displayed by stamping, printing, etc., on the focus ring 1. A mark 21b is provided on a fixed lens barrel (not shown) that rotatably supports the focus ring 21 and the "in-focus distance" at which the focus is set can be read from the distance scale 21a and the mark 21b.

Reference numeral 18 shows an absolute rotation position encoder that outputs a signal for detecting the rotation position (absolute position) of the focus ring 21, Reference numeral 19 shows a micro angular displacement detection pulse encoder, which is provided as necessary to detecting the micro rotation angle of the focus ring 21, and Reference numeral 25 shows a focus ring drive motor.

When the focus lens unit 7 needs to be driven for an autofocus operation, a controller 10 drives the focus ring drive motor 25 in accordance with the drive details. The actual position of the focus ring 21 is detected by the signal from the absolute rotation position encoder 18 and the focus motor 14 is driven so that the focus lens unit 7 is positioned at the position corresponding to the detected position of the focus ring 21.

Here, in the case of a rear focus lens or an inner focus lens, since even if the focus lens unit 7 is at the same position along the optical axis, the in-focus distance will differ according to the focal length (zoom position), the focal length information from the zoom encoder 13 is constantly taken in by the controller 10.

The autofocus operation and the operation during a manual focus operation shall now be described.

Figure 5:
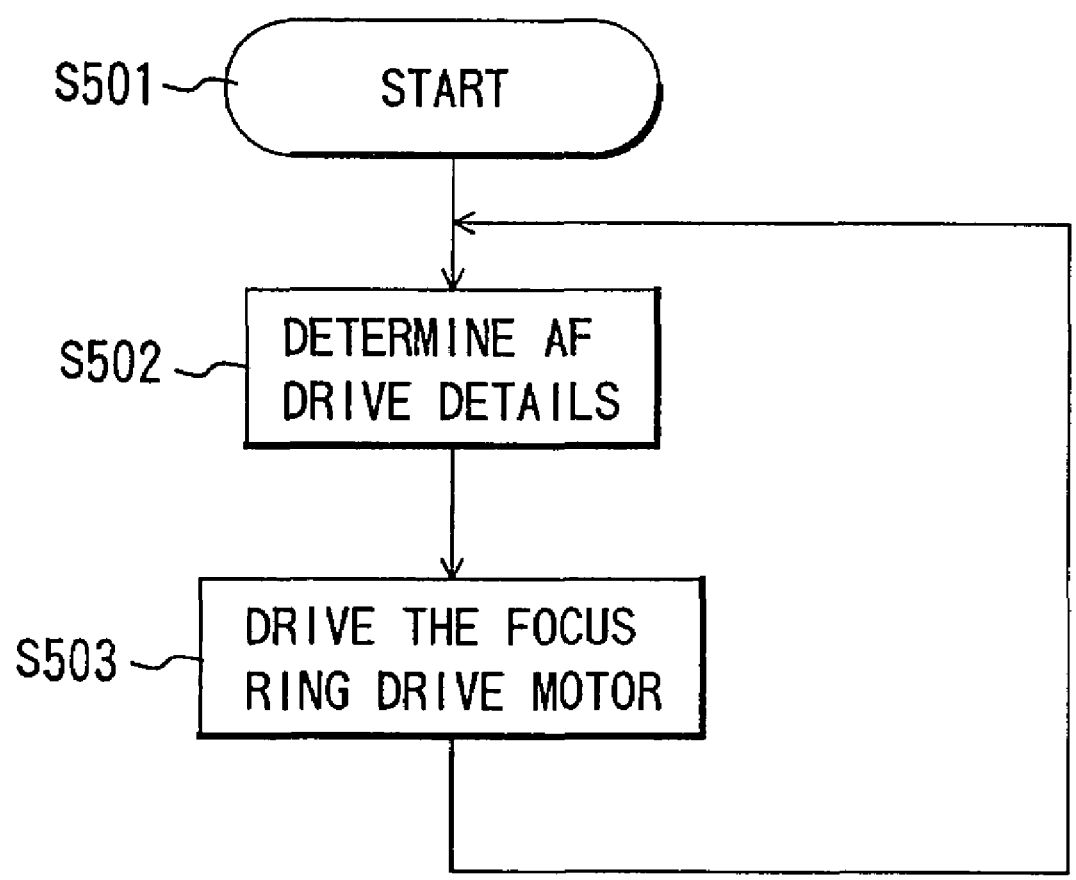
FIG. 5 is a flowchart illustrating the operation of the optical apparatus of Embodiment 2 (and Embodiments 3 and 11).

FIG. 5 is a flowchart illustration the operation of the controller 10 during the autofocus operation.

In FIG. 5, starting is performed in step 501. In step 502, the direction and speed for driving the focus lens unit 7 for the autofocus operation are determined. Here, the contents are determined according to predetermined conditions, such as a change observed in a signal indicating the focusing state for in-focus position search by a television signal autofocus operation (in many cases, this signal is of a value resulting from the extraction of high-frequency components contained in the video signal). Then in step 503, the focus ring drive motor 25 is driven to drive the focus ring 21 in accordance with the conditions determined in step 502.

The operation of the controller 10, which are performed when a focusing operation of moving the focus lens unit 7 in accordance with the displacement (movement) of the focus ring 21 is performed, shall now be described using the flowchart of FIG. 6. The operation of FIG. 6 is performed both in a case where the focus ring 21 is rotated by the autofocus operation as described using FIG. 5 and in a case where the focus ring 21 is operated manually by an operator.

Figure 6:
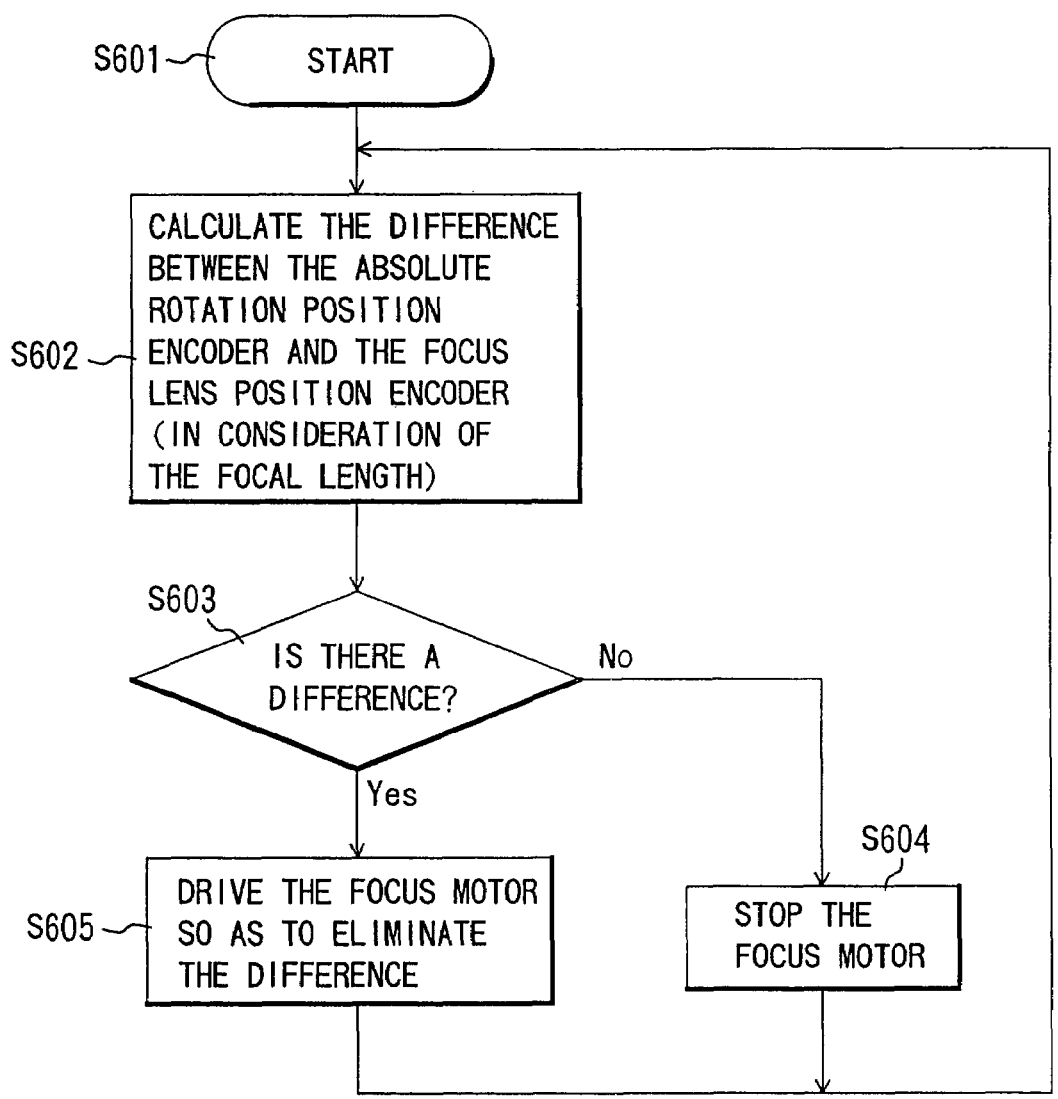
FIG. 6 is a flowchart illustrating the operation of the optical apparatus of Embodiment 2 (and Embodiments 3, 6, and 11).

In FIG. 6, starting is performed in step 601. In step 602, the output of the absolute rotation position encoder 18 (position information) and the output of the focus lens position detection encoder 15 (position information) are read (detected) at the sampling period and the difference between these outputs is calculated.

Here, the "difference" is the difference between the value (converted position information) resulting from the conversion of the position information from the absolute rotation position encoder 18 to the position information that should be obtained from the focus lens position detection encoder 15 in consideration of the focal length information obtained from the zoom encoder 13 and the actual position information that is obtained from the focus lens position detection encoder 15. The focal length information is considered since, with a rear focus zoom or inner focus zoom lens, the in-focus distance differs for the same position of focus lens unit 7 if the focal length differs.

The controller 10 has stored, in advance in the memory 10a inside the controller 10 shown in FIG. 4, data (table data, etc.) or a calculation formula for conversion of the position information from the absolute rotation position encoder 18 to the position information that should be obtained from the focus position detection encoder 15, in other words, the information indicating the relationship (correspondence) that should hold primarily for the position information of the focus ring 21 and the position information of the focus lens unit 7.

When the difference between the converted position information and the actual position information from the focus lens position detection encoder 15 is zero, that is, when the position information of the absolute rotation position encoder 18 and the position information of the focus lens position encoder 15 are in the "relationship (correspondence) that should hold", the in-focus distance indication at the focus ring 21 will be in a state of correspondence with the position of the focus lens unit 7.

Next in step 603, it is judged whether or not the difference between position information is zero or no more a predetermined minute amount (threshold value). When the difference is zero or within the range of the predetermined minute amount, step 604 is entered and the focus motor 14 is stopped. When the difference is not zero or exceeds the predetermined minute amount, step 605 is entered and the focus lens unit 7 is driven by the focus motor 14 so that this difference becomes zero or equal to or less than the predetermined minute amount.

Thus with this embodiment, the focus lens unit 7 is put in the state where it is moved to a position corresponding to the position of the focus ring 21. The distance indication of the focus ring 21 and the actual distance state of the focus lens 7 can thus be put constantly in a substantially corresponding state of low deviation so as to enable the in-focus distance to be maintained as it is indicated.

Since the operation of the flowchart shown in FIG. 6 is performed constantly (at the sampling period), it is carried out immediately when the focus ring 21 is operated by the autofocus operation and by manual operation by an operator. Also, even if autofocusing is not performed or the focus ring 21 is not operated, this operation is performed immediately when the position information of the absolute rotation position encoder 18 and the position information of the focus lens position detection encoder 15 deviates from the "relationship that should hold."

(Embodiment 3)

Though the above-described Embodiment 2 is structured so that the positional relationship of the focus lens unit 7 and the focus ring 21 is matched constantly, in an actual case of controlling the driving of a focus lens unit, the depth of field becomes extremely deep at the wide angle side focal length in particular. Especially with CCD's and other image pickup elements becoming as compact as they have in recent years, cases may occur where, the minimum object distance becomes, for example, 1 m or even less depending on the stop value (narrow aperture), with the infinite distance being set as the far point of the depth of field at the wide angle end. Due to this circumstance, if in performing a "wobbling operation" (an operation wherein the focus lens unit is vibrated back and forth by a minute amount in the optical axis direction and the variation of the high frequency component in the video signal that is synchronized with this vibration is determined to determine the out-of-focus direction, that is, whether the focusing state is the front focus state or the back focus state), which is a well-known operation for autofocusing using television signals, an attempt is made to make the focus ring indication correspond correctly to the in-focus distance without considering the depth of field, the focus ring will have to be reciprocated frequently at high speed and within a large rotation range, thus making tracking practically impossible. Vibration noise will also be generated.

Thus in consideration of the above point, with the present embodiment, in step 603 of FIG. 6, the threshold value for judging that there is a difference between the detection results of the absolute rotation position encoder 18 and the focus lens position detection encoder 15 is set so that such a response (a situation where just the focus ring is driven violently even though focus is attained) will not occur.

The focus ring 21 may also be structured so as not to respond (not to be driven) during the above-described wobbling operation (while the wobbling drive signal is being output). In this case, the wobbling operation is excluded from the operation to be considered in step 502 in FIG. 5. The focus ring 21 (that is, the focus ring drive motor 25) is thus driven in response only to the focus drive signal (a first signal) and does respond to the wobbling drive signal (a second signal). On the other hand, the focus lens unit 7 is driven by the focus motor 14 in response to the wobbling drive signal.

(Embodiment 4)

Figure 7:
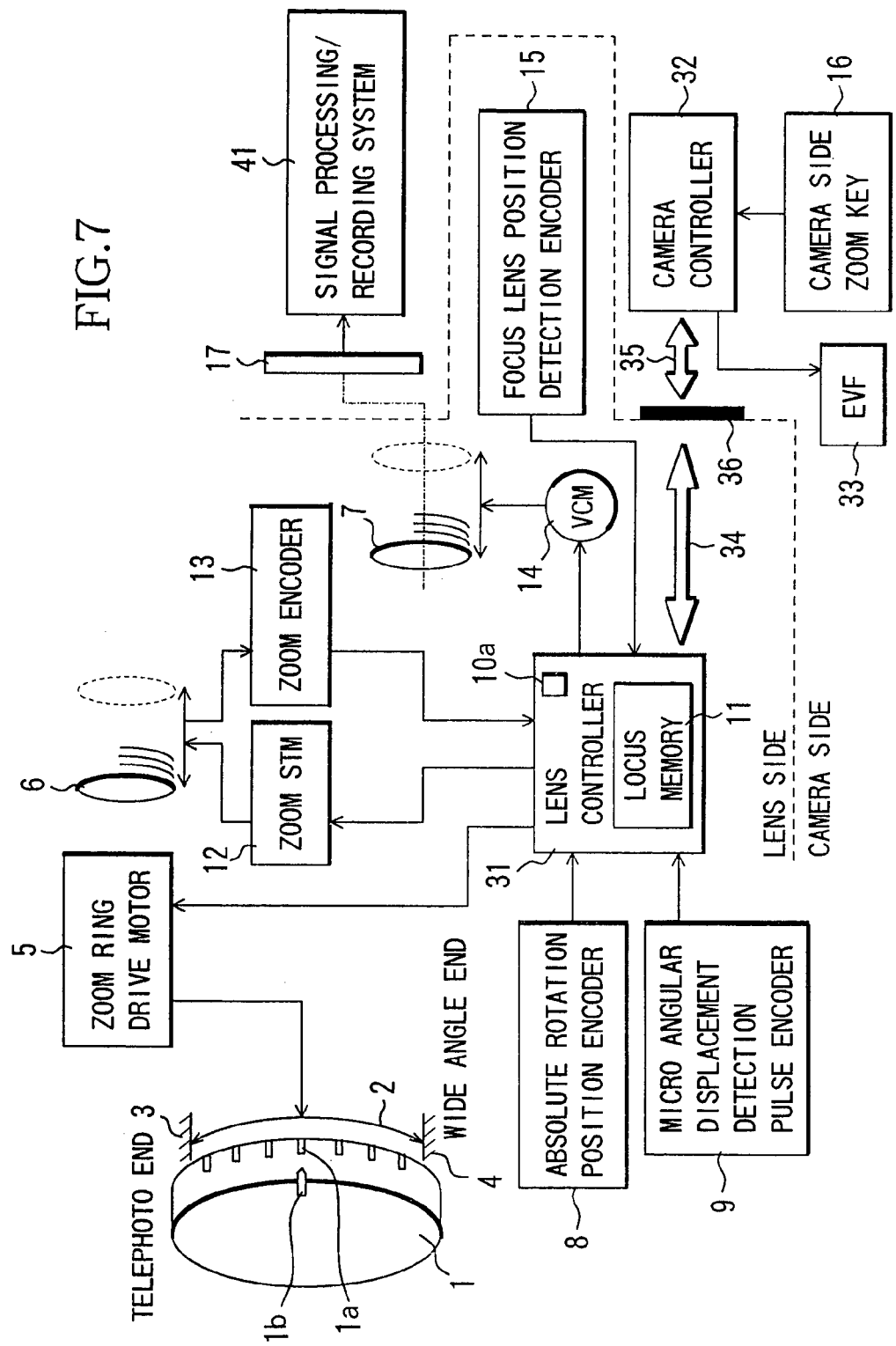
FIG. 7 is a block diagram showing the structure of an optical apparatus of Embodiment 4 of the present invention.

FIG. 7 is a block diagram for describing Embodiment 4 of an optical apparatus of the present invention and shows Embodiment wherein the invention is applied to a camera system (optical apparatus) structured from an interchangeable lens and an image-taking apparatus (digital still camera, video camera, etc.) to which this interchangeable lens can be mounted. In FIG. 7, components that are the same as those of FIG. 1 are provided with the same Reference numerals and description thereof shall be omitted.

In FIG. 7, the boundary between the interchangeable lens and the image-taking apparatus (camera) to which this interchangeable lens can be mounted is indicated by broken lines.

Reference numeral 36 shows an electrical contact provided at mount portions of the interchangeable lens and the camera. A camera controller (signal output unit) 32 which is a control circuit at the camera side, and a lens controller 31 which is a control circuit at the lens side, communicate with each other via the contact 36 and through a camera side communication path 35 and a lens side communication path 35. A receiving circuit at the lens side is structured from the electrical contact 36 and the lens side communication path 34. Also, power from the camera is supplied to the lens via the contact 36.

Reference numeral 33 shows an electronic viewfinder (EVF), which is structured from a liquid crystal panel, etc., to display the image signal taken by-an image pickup element 17 and display various contents, such as focal length information, in-focus distance information, etc.

The operation of this embodiment shown in FIG. 7 is the same as the operation illustrated in the flowcharts of FIGS. 2 and 3, which have been described for Embodiment 1. Here, FIGS. 2 and 3 shall be used to describe the operation of the present embodiment while clarifying the controller which performs the operation of the respective steps.

The flowchart of FIG. 2 shall be used to describe the operation of the camera controller 32 and the lens controller 31 in accordance with the operation of the zoom key 16 (power zoom operation) of the present embodiment.

First, when the zoom key 16 that is provided at the camera side is operated (step 202), the operation direction information and speed information based on the operation of the zoom key 16 are detected by the camera controller 32 (step 203), and the results are converted into predetermined signals as necessary and transmitted from the camera controller 32 to the lens controller 32 via the contact 36.

Upon receiving these pieces of information, the lens controller 31 drives the zoom ring drive motor 5 to perform rotation drive of the zoom ring 1 (step 204).

Next, the flowchart of FIG. 3 shall be used to describe the operation of the lens controller 31 during the zooming operation of moving the variator lens unit 6 and the focus lens unit 7 in accordance with the displacement (movement) of the zoom ring 1 in the present embodiment. The operation of FIG. 3 is performed both in the case where the zoom ring 1 is rotated by the operation of the zoom key 16 (power zoom operation) as described using FIG. 2 above and in the case where the zoom ring 1 is operated manually by an operator. All of the flow shown in FIG. 3 is performed at the lens controller 31.

In FIG. 3, starting is performed in step 301. In step 302, the output of the absolute rotation position encoder 8 and the output of the zoom encoder 13 are read as mentioned above at the sampling period, and the difference between these outputs is calculated. Here the "difference" is the same as that described for Embodiment 1.

In step 303, the lens controller 31 judges whether the difference calculated in step 302 is zero or within a minute amount corresponding to a predetermined dead zone, or there is a difference. When the difference is zero or within the minute amount, step 304 is entered and the zoom motor 12 is stopped. When the difference is not zero or exceeds the minute amount in step 303, step 305 is entered and the zoom motor 12 is driven so that this difference becomes zero or falls within the minute amount.

At the same time, for the zoom tracking operation (compensator action), the focus lens unit 7 is moved to an appropriate position in a tracking manner by using the focus motor 14 and the focus lens position encoder 15. The state in which zooming operation of the optical system (movement of the variator lens unit 6 and focus lens unit 7) is carried out to a position that corresponds to the position of the zoom ring 1 is thus attained.

Since the operation of the flowchart shown in FIG. 3 are performed constantly (at the sampling period), it is carried out immediately when the zoom ring 1 is operated by the operation of the zoom key 16 and by manual operation by the operator.

With the present embodiment, the detection result of the signal from the absolute rotation position encoder 8 that indicates the position of the zoom ring 1, that is, the information indicating the current focal length is communicated from the lens controller 31 to the camera controller 32 via the contact 36. Upon receiving this information, the camera controller 32 displays the information concerning the focal length on the EVF 33. The display on the EVF 33 may be carried out not only in this embodiment's camera system, which combines an interchangeable lens and a camera, but may also be carried out in the image-taking apparatuses of Embodiments 1 to 3 described above.

Thus with this embodiment, the optical system (variator lens unit 6 and focus lens unit 7) is positioned by zooming operation at a position corresponding to the position of the zoom ring 1. The focal length indication of the zoom ring 1 and the state of the actual focal length of the optical system can thus be put constantly in a substantially corresponding state of low deviation so as to enable the focal length to be maintained as it is indicated by the scale 1a and the mark 1b or on the EVF 33.

Though with each of Embodiments described above, a case where a ring-shaped member is used as the operating member, a scale is formed on this operating member, and a mark is provided at the fixed member side to indicate the focal length or in-focus distance is described, as long as the movable range is limited by mechanical ends, the operating member does not have to be of a ring shape and, for example, may be a sliding knob that moves rectilinearly or other type of operating member. Also, though these embodiments are structured so that the indication and the actual state of the lens (focal length or in-focus distance) are matched constantly, even if for example there is no indication, it is sufficient that the position within the movable range of the operating member is matched with the state of the lens (lens position).

Also, though with each of Embodiments described above, a structure using a rear focus (inner focus) zoom lens having a 4-unit lens structure was described, the present invention may also be applied to the optical systems of front focus type zoom lenses and of multiple lens unit rear focus (inner focus) zoom lenses with 3 lens units or 5 lens units, etc.

As described above, with Embodiments 1 to 4, the correspondence between the movement of a movable lens and the operating position of an operating member can be maintained and the operability can be improved.

(Embodiment 5)

Figure 8:
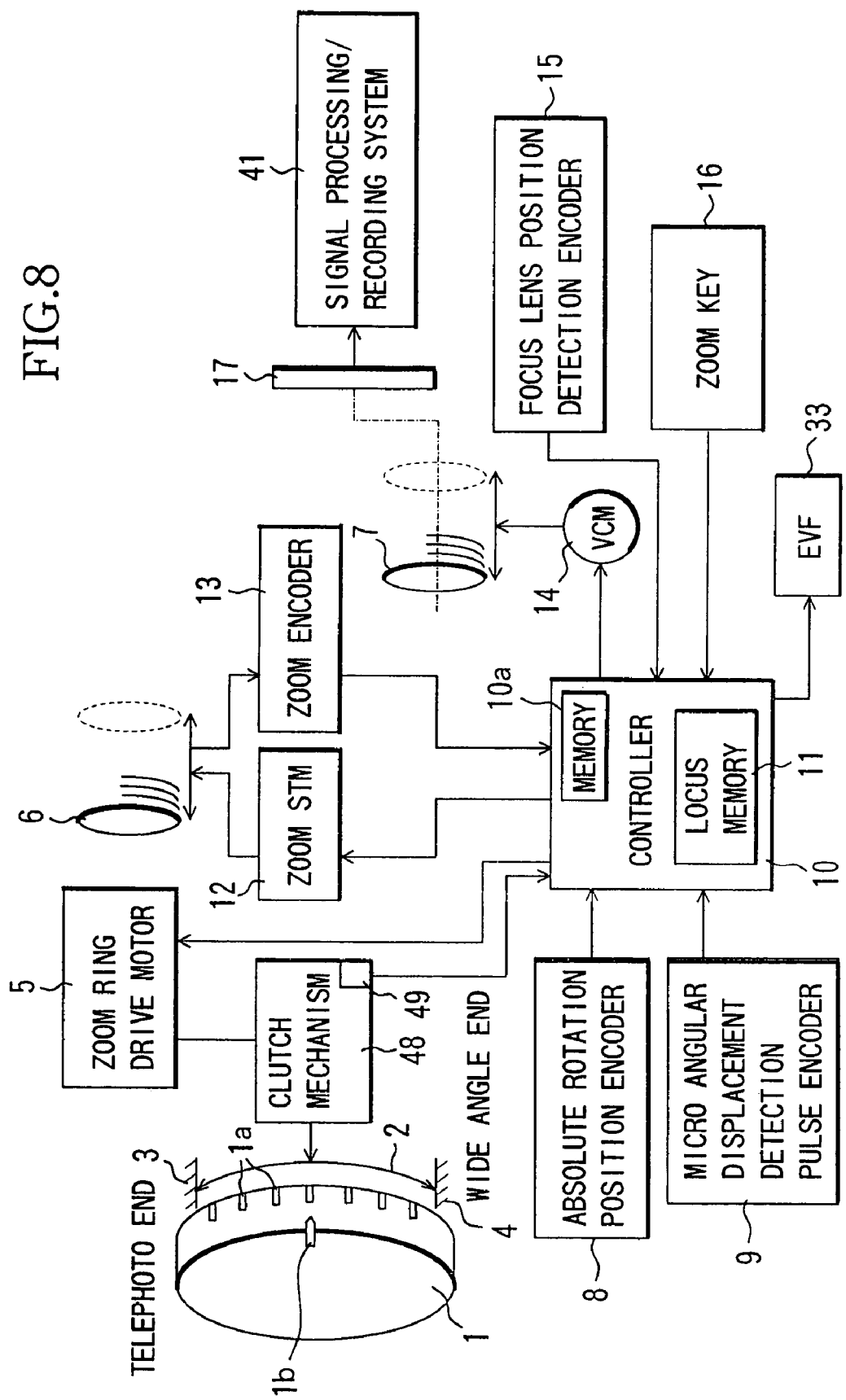
FIG. 8 is a block diagram showing the structure of an image-taking apparatus of Embodiment 5 of the present invention.

FIG. 8 shows a block diagram for describing an image-taking apparatus of Embodiment 5 of an optical apparatus of the present invention and this embodiment is an example wherein the invention is applied to a zoom mechanism of a digital still camera, video camera, or other image-taking apparatus equipped with a rear focus zoom lens optical system. With this embodiment's image-taking apparatus, the main camera body part is provided with an integral lens part. The basic structure of this embodiment's image-taking apparatus is the same as that described for Embodiment 1, and the components that are in common to those of Embodiment 1 are provided with the same Reference numerals and description thereof shall be omitted.

Reference numeral 48 shows a clutch mechanism (switching mechanism), which is switchable between a transmitting state, in which a drive force from the zoom ring drive motor 5 is transmitted to the zoom ring 1, and a non-transmitting state, in which this drive force is not transmitted.

Here, in a case where clutch mechanism 48 is structured as a gear train from the zoom ring drive motor 5 to the zoom ring 1, a structure, which can be switched between a state wherein two of the gears in the gear train are engaged (transmitting state) and a state wherein the two gears are disengaged (non-transmitting state), may be used. Also, a structure, which can be switched between a state wherein a member to which the drive force from the motor 5 is input using an electromagnetic force is connected with a member that outputs to the zoom ring 1 (transmitting state) and a state wherein the two members are disconnected (non-transmitting state), may also be used.

Furthermore, even in a case where an input side member and an output side member are connected constantly, a structure, which can be switched between a state wherein the connection torque is large so that the required torque can be transmitted from an input side member to an output side member (transmitting state) and a state wherein the connection torque is small so that the required torque transmission cannot be performed, may be used.

The switching of this clutch mechanism 48 may be performed by manual operation of a lever, etc., or by driving of an actuator upon operation of a switch.

Reference numeral 49 shows a clutch detection switch which outputs a signal for detecting the transmitting/non-transmitting state of the clutch mechanism 48. A contact type switch (for example, a micro switch) or a non-contact type switch (for example, a photointerrupter) may be used as the clutch detection switch 49.

Reference numeral 33 shows an EVF of the same type as that described for Embodiment 2.

The operation of the image-taking apparatus of the present embodiment shall now be described. First, a case where an operator performs a manual zooming operation shall be described. Though it is preferable, in terms of the operability of manual operation, for the clutch mechanism 48 to be set to the non-transmitting state when an operator performs a manual zooming operation, a manual zooming operation may in some cases be performed with the clutch mechanism 18 being in the transmitting state.

When the operator rotates the zoom ring 1, the rotation (movement amount, movement position) of the zoom ring 1 is detected by an absolute rotation position encoder 8. The absolute rotation position encoder 8 transmits the detected information (information on the movement amount or the movement position of the zoom ring 1) to the controller 10.

The controller 10 uses this information and information from the zoom encoder 13 to drive the zoom motor 12 so that the variator lens unit 6 moves to an optimal position at which the new focal length indicated by the zoom ring 1 is formed. At the same time, for the zoom tracking operation (compensation of the image plane variation that accompanies the magnification changing movement), the controller 10 uses information stored in the locus memory 11 and information from the focus lens position detection encoder 15 to drive the focus motor 14 so that the focus lens unit 7 moves to a position at which the in-focus state will be maintained. The optical system (variator lens unit 6 and focus lens unit 7) is thereby set at a zoom position corresponding to the position of the zoom ring 1.

As the zoom motor 12 and focus motor 14, motors or actuators of specifications enabling high-speed driving of the lens units are preferably selected so that the zoom ring 1 can be tracked even when it is rotated at high speed.

Also, the zoom ring 1 is preferably structured with the rotational torque being controlled to a suitable value by grease, etc., so that a suitable resisting sensation (good operating sensation for manual operation) will be provided and operation of excessively high speed will be prevented.

Next, a case where the zoom key 16 of this embodiment's image-taking apparatus is operated (power zoom operation) shall be described.

When the zoom key 16 is operated by the operator, the controller 10 checks the signal from the clutch detection switch 49 and detects whether the clutch mechanism 48 is in the transmitting state or the non-transmitting state.

When the clutch mechanism 48 is detected to be in the transmitting state, the controller 10 drives the zoom ring drive motor 5 in accordance with the operation of the zoom key 16.

For example, if in the case of a structure in which the zoom speed can be set to any of a plurality of speed settings in accordance with the pressing amount or pressure of the zoom key 16, an instruction to zoom from the wide angle to telephoto direction at the fastest speed is provided to the controller 10 from the zoom key 16, and then the zoom ring drive motor (stepping motor) 5 is driven at a pulse input interval corresponding to the "fastest speed" which is priorly set. If the zoom ring drive motor 5 is a DC motor, the DC motor is driven, for example, with the ON/OFF proportion of the application voltage being set to a proportion (for example, ON 100%, OFF 0%) corresponding to the "fastest speed" which is priorly set.

Here, the "fastest speed" refers to the maximum speed in the drive control using the motor 5 and is set to an optional speed.

The detection of the rotation of the zoom ring 1 is performed constantly (at every preset sampling period to be described below) by the absolute rotation position encoder 8. Thus the rotation of the zoom ring 1 that is driven by the zoom ring drive motor 5 is also detected by the absolute rotation position encoder 8. The output of the absolute rotation position encoder 8 (position information on the zoom ring 1) is output to the controller 10, and in accordance with this position information and the output (position information on the variator lens unit 6) from the zoom encoder 13, the controller 10 drives the zoom motor 12 to move the variator lens unit 6 to the position corresponding to the position of the zoom ring 1. At the same time, for the zoom tracking operation (compensator operation), the focus lens unit 7 is driven by the focus motor 14 in the same manner as described above.

Here, if the zoom ring 1 for example is held by the operator when the zoom key 16 is operated, the zoom ring drive motor 5 cannot drive even though it attempts to drive (the motor 5 becomes locked or slips due to the clutch mechanism 48) and consequently, the zoom ring 1 does not rotate. Since the absolute rotation position encoder 8 detects the position at which the zoom ring 1 did not rotate, the zooming operation is not performed.

Thus with the present embodiment, zooming can be performed by operating either the zoom ring 1 or the zoom key 6.

On the other hand, when the clutch mechanism 48 is in the non-transmitting state, the input of the zoom key 16 is ignored (made ineffective) and the driving of the zoom ring drive motor 5 in accordance with the signal input from the zoom key 16 is not performed.

The driving of the zoom ring drive motor 5 in the state in which its driving force is not transmitted to the zoom ring 1 is thereby prevented to restrain wasteful consumption of the power (battery) of the image-taking apparatus.

Also, structures may be made to display a warning on the screen of the EVF 33 to notify the operator that the clutch mechanism 48 is not in the transmitting state (zooming operation by operation of the zoom key 16 cannot be performed) in this case. A situation, wherein the operator does not notice that the clutch mechanism 48 is in the non-transmitting state and is unable to perform zooming no matter how much the zoom key 16 is operated and is thereby prevented from performing the desired image taking, can thus be avoided.

A structure is also possible wherein, instead of the above-described warning display, a warning sound is emitted.

The operation of the controller 10 in the above-described manual zooming operation and the power zooming operation shall now be described using the flowchart of FIG. 9.

Figure 9:
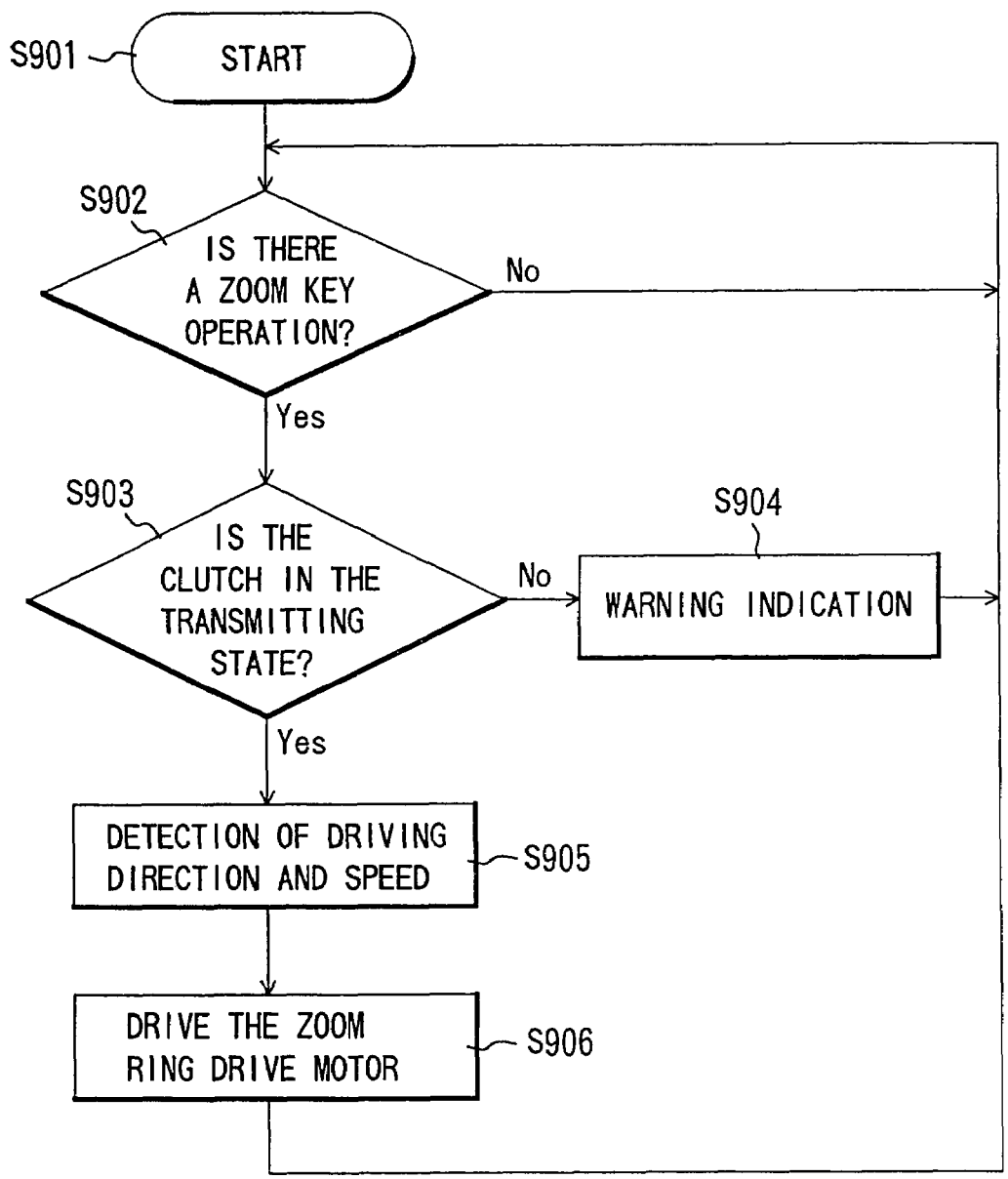
FIG. 9 is a flowchart illustrating the operation of the image-taking apparatus of Embodiment 5.

FIG. 9 is a flowchart illustrating the operation of the controller 10 related to the operation of the zoom key 16 (power zoom operation).

In FIG. 9, the present operation is started in step (indicated as S in the Figure) 901 when the power of the image-taking apparatus is turned ON, etc., In step 902, the controller 10 detects whether or not operation of the zoom key 16 is occurred (whether or not a signal is input from the zoom key 16).

In the case of a video camera, this detection is performed at the sampling period (a field period of 1/60 seconds in the case of an NTSC television system and 1/50 seconds in the case of a PAL system, or at a period of even higher rate).

When the zoom key 16 is operated, the controller 10 enters step 903. In step 903, the signal from the clutch detection switch 49 is checked to judge whether or not the clutch mechanism 48 is in the transmitting state. When the current state is judged to be the non-transmitting state, step 904 is entered, and a warning indication is performed on the screen of the EVF 33 as described above. When the clutch mechanism 48 is judged to be in the transmitting state in step 903, step 905 is entered, the sign (operation direction) and the magnitude (operation amount) of the signal from the zoom key 16 are detected, and the drive direction and drive speed of the zoom motor 12 to be described later are set accordingly.

In many cases where the zoom key 16 is a seesaw switch, structures are made so that a higher zoom speed is set the deeper the amount by which the key is pressed or the stronger the pressure by which the key is pressed.

In step 906, the zoom ring drive motor 5 is driven in and at the drive direction and drive speed set in step 905. The zoom ring 1 is thereby rotated and the following operation is performed.

The operation, which the controller 10 performs when a zooming operation (driving of the variator lens unit 106 and the focus lens unit 7) is performed in accordance with the rotation (displacement) of the zoom ring 1, is the same as that described for Embodiment 1 using FIG. 3 and description thereof shall therefore be omitted.

The state in which zoom movement of the optical system (variator lens unit 6 and focus lens unit 7) is carried out to a position corresponding to the position of the zoom ring 1 is maintained with the present embodiment as well. The focal length indication of the zoom ring 1 and the actual state of the focal length of the optical system can thus be put constantly in a substantially corresponding state of low deviation so as to enable the focal length to be maintained as it is indicated.

(Embodiment 6)

Figure 10:
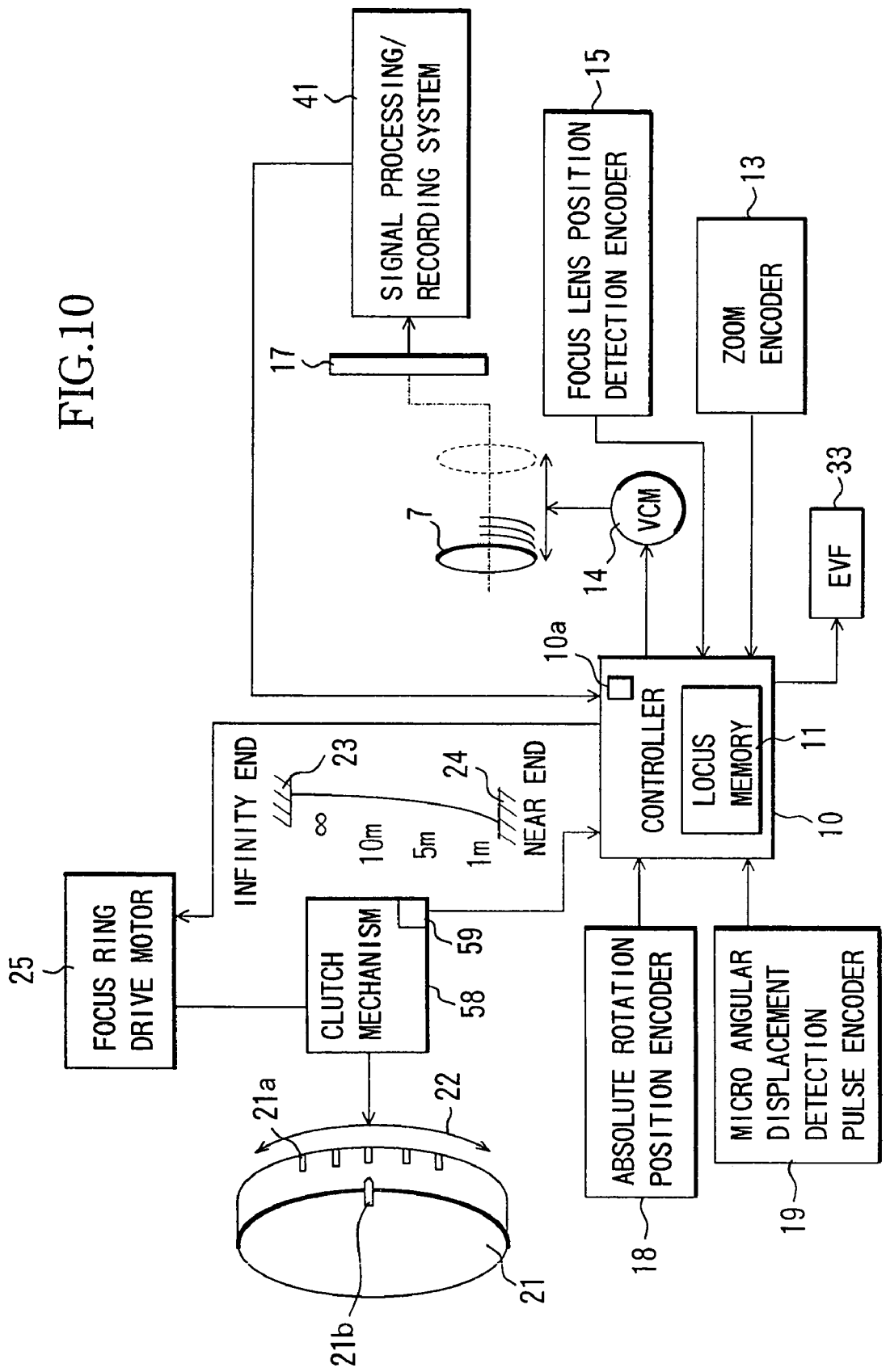
FIG. 10 is a block diagram showing the structure of an image-taking apparatus of Embodiment 6 of the present invention.

FIG. 10 shows a block diagram for describing Embodiment 6 of an optical apparatus of the present invention. This embodiment is an example wherein the invention is applied to a focus mechanism of a digital still camera, video camera, or other image-taking apparatus equipped with a rear focus zoom lens optical system. The 4-unit rear focus zoom type optical system is applied in the present embodiment as well. Also in FIG. 10, the focus lens unit 7 is illustrated and the other lens units are omitted from illustration. Also, the basic structure of this embodiment's image-taking apparatus is the same as that described with Embodiment 2 and the components that are in common to those of Embodiment 2 are provided with the same Reference numerals as those of Embodiment 2 and description thereof shall be omitted.

In driving the focus lens unit 7 for an autofocus operation, the controller 10 first drives the focus ring drive motor 25 in accordance with preset drive details (drive direction, drive speed, and drive amount). When the focus ring drive motor 25 is driven, the focus ring 21 rotates, and the position of the focus ring 21 is detected via the absolute rotation position encoder 18. The detection of the position of the focus ring 21 by the absolute rotation position encoder 18 is performed at each sampling period mentioned above. The focus motor 14 is then driven so that the focus lens unit 7 moves to the position corresponding to the detected position of the focus ring 21.

Here, in the case of a rear focus lens or an inner focus lens, since even if the focus lens 7 is at the same position along the optical axis, the in-focus distance will differ according to the focal length (zoom position), the zoom lens unit position information (focal length information) from the zoom encoder 13 is taken in by the controller 10.

A clutch mechanism 58 is disposed between the focus drive motor 25 and the focus ring 21 in the present embodiment as well. When the clutch mechanism 58 is in the transmitting state, the above-described autofocus operation can be performed since the drive force of the focus ring drive motor 25 can then be transmitted to the focus ring 21.

Meanwhile, when the clutch mechanism 58 is put in the non-transmitting state, since the focus ring 21 is disengaged from the focus ring drive motor 25, the operability of rotatingly operating the focus ring 21 manually can be improved.

As in Embodiment 5, the transmitting state (autofocus side) and the non-transmitting state (manual focus side) of this clutch mechanism 58 can be detected by a clutch detection switch 59. Also, as the clutch mechanism 58, the same type of mechanism as the clutch mechanism 48 described for Embodiment 5 can be used.

The operation that the controller 10 performs during an autofocus operation shall now be described using the flowchart of FIG. 11.

Figure 11:
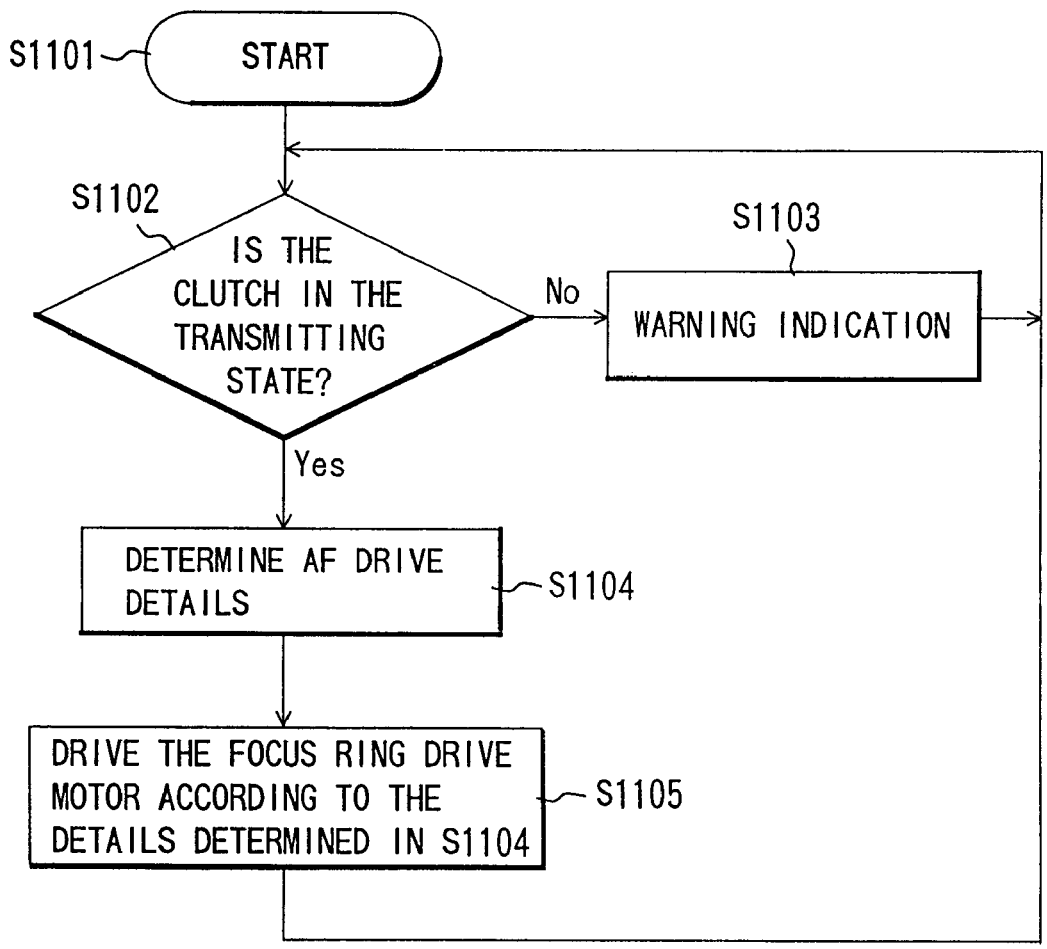
FIG. 11 is a flowchart illustrating the operation of the image-taking apparatus of Embodiment 6.

In FIG. 11, the present operation is started in step 1101 when the power of the image-taking apparatus is turned ON, etc., In step 1102, the controller 10 checks the output of the clutch detection switch 59 and detects whether or not the clutch mechanism 58 is in the transmitting state. When the clutch mechanism 58 is in the non-transmitting state (manual focus side) step 1103 is entered, and as was described for Embodiment 5, that manual focus is selected (autofocus cannot be performed) is indicated on the screen of the EVF 33 and a return to step 1102 is performed.

Thus in the case where the clutch mechanism 58 is in the non-transmitting state which drives of the focus ring drive motor 25 in accordance with the signal input for the autofocus operation is not performed.

The driving of the focus ring drive motor 25 in the state in which its driving force is not transmitted to the focus ring 21 can thereby be prevented to restrain wasteful consumption of the power (battery) of the image-taking apparatus.

Also, by a warning indication being displayed on the screen of the EVF 33 (or by output of a warning sound), a situation, wherein an operator, who is taking an image with the expectation that the autofocus operation will be performed, does not notice that the clutch mechanism 58 is in the non-transmitting state and takes an image that is not in focus, can be avoided.

On the other hand, when the clutch mechanism 58 is detected to be in the transmitting state (autofocus side), step 1104 is entered and the controller 10 determines the direction and speed for driving the focus lens unit 7 (the focus ring drive motor 25) for the autofocus operation.

Here, the video signal that is used as the signal indicating the focusing state for in-focus position search by a so-called television signal autofocus operation (that is, used as a signal for focusing) (in many cases, this signal is of a value resulting from the extraction of high-frequency components contained in the video signal) is input from the signal processing/recording system 41 into the controller 10. The drive details (drive direction, speed, and drive amount) of the focus lens unit 7 (focus ring drive motor 25) are determined under predetermined conditions so as to be of values that are suited, for example, for finding the position at which the value obtained by extraction of the high frequency components contained in the video signal will be maximized.

Then in step 1105, the controller 10 drives the focus ring drive motor 25 and thereby rotates the focus ring 21 in accordance with the conditions determined in step 1104. The operation described for Embodiment 2 using FIG. 6 is thereby carried out (the description thereof shall be omitted).

The state in which the focus lens unit 7 is moved to a position corresponding to the position of the focus ring 21 is maintained with this embodiment as well. The distance indication of the focus ring 21 and the actual in-focus distance state of the focus lens 7 can thus be put constantly in a substantially corresponding state of low deviation so as to enable the in-focus distance to be maintained as it is indicated.

Though for the present embodiment, a case where the controller 10 is provided with the function of determining the drive details of the focus lens unit 7 (focus ring drive motor 25) for the autofocus operation was described, a circuit unit (signal output unit) having this function may be provided apart from the controller 10, and signals in accordance with the determined drive details (signals for moving the focus lens 7) may be input from this circuit unit into the controller 10.

(Embodiment 7)

Figure 12:
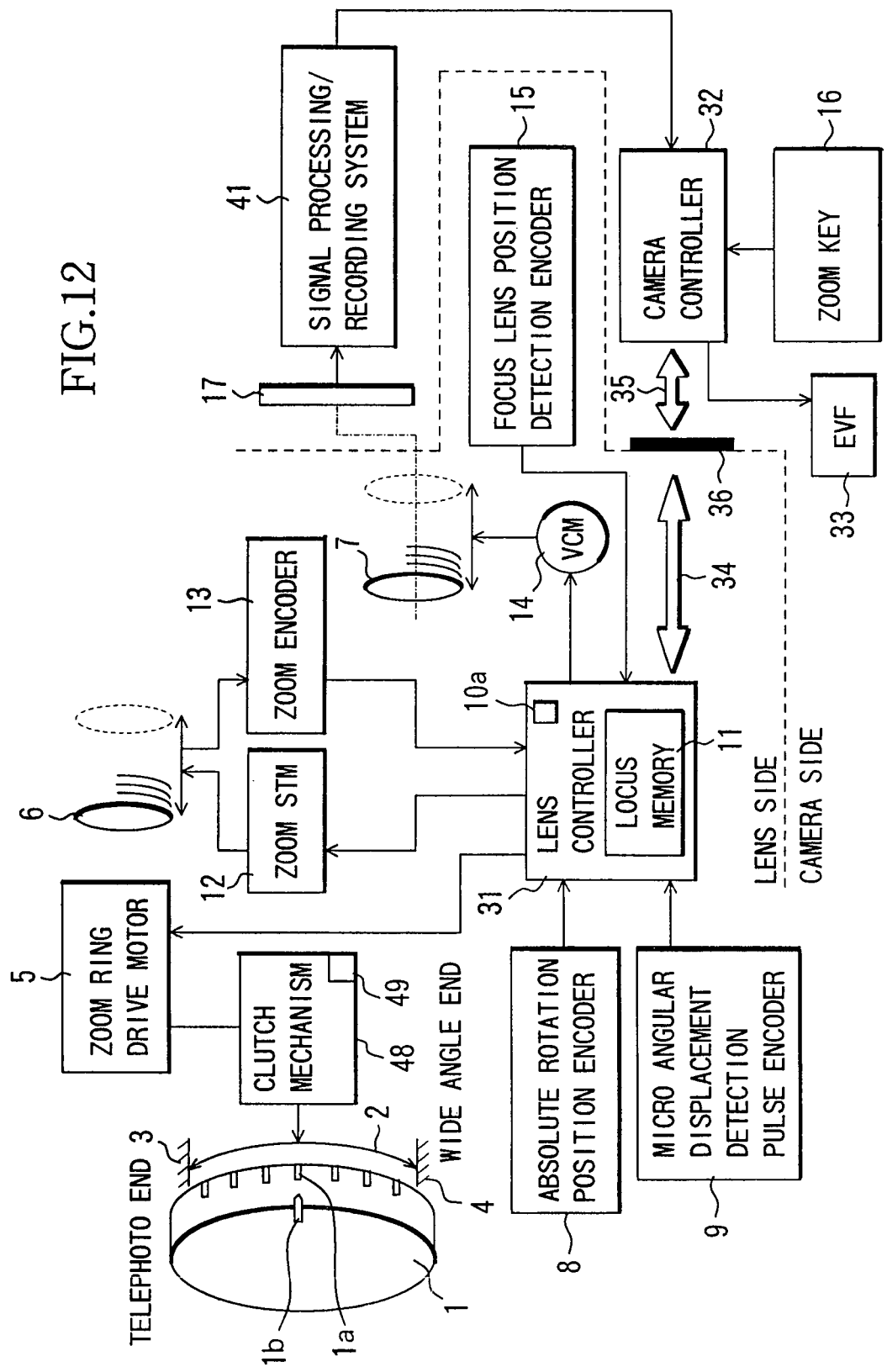
FIG. 12 is a block diagram showing the structure of a camera system of Embodiment 7 of the present invention.

FIG. 12 shows a block diagram for describing a camera system (optical apparatus), which is Embodiment 7 of an optical apparatus of the present invention. As with Embodiment 4, the present embodiment is an example wherein the invention is applied to an interchangeable lens apparatus that can be mounted to a camera (digital still camera or video camera). The structure blocks are divided into those of the camera side and those of the lens side at the broken lines in FIG. 12 as the boundary, and these are joined by mount portions of the camera and interchangeable lens. Also in FIG. 12, the components that are in common to those of Embodiment 4 are provided with the same Reference numerals and description thereof shall be omitted.

The operation of the lens controller 31 of this embodiment is the same as the operation described for Embodiment 5 using the flowchart of FIG. 9 and the operation described for Embodiment 1 using the flowchart of FIG. 3. Here, the operation of the lens controller 31 and the camera controller 32 shall be described using FIGS. 9 and 3 upon clarifying the controller which performs the operation of the respective steps.

First, the operation of the lens controller 31 and the camera controller 32 that is carried out upon operation of the zoom key 16 (power zoom operation) of this embodiment shall be described using the flowchart of FIG. 9.

When the power of the camera is turned ON, the present flow is started at step 901. When in step 902, the camera controller 32 detects the input of an operation signal from the zoom key 16 that is provided at the camera side, the camera controller 32 sets the zoom direction and zoom speed from the operation signal, and upon converting, etc., the information on the set zoom direction and zoom speed as necessary into predetermined signals, sends the signals to the lens controller 31 via the contact 36 and communication paths 34 and 35.

Next, upon receiving the information on the zoom direction and the zoom speed, the lens controller 31 checks the signal from the clutch detection switch 49 and detects whether or not the clutch mechanism 48 is in the transmitting state in step 903. When the clutch mechanism is detected to be in the non-transmitting state, the lens controller 31 does not perform driving of the zoom ring drive motor 5 in accordance with the input of information on the zoom direction and the zoom speed from the camera controller 32. Also at this time, the lens controller 31 sends information indicating that the clutch mechanism 48 is in the non-transmitting state to the camera controller 32. Upon receiving this information, the camera controller 32 performs a warning indication on the EVF 33 (step 904).

The driving of the zoom ring drive motor 5 in the state in which its driving force is not transmitted to the zoom ring 1 can thereby be prevented to restrain wasteful consumption of the power (battery) of the camera.

Also, by a warning indication being made to be displayed on the screen of the camera's EVF 33 in accordance with the signal from the lens controller 31, a situation, wherein the operator does not notice that the clutch mechanism 48 is in the non-transmitting state and is unable to perform zooming no matter how much the zoom key 16 is operated and is thereby prevented from performing the desired image taking, can be avoided.

On the other hand, when in step 903, the clutch mechanism 48 is detected to be in the transmitting state by the signal from the clutch detection switch 49, step 905 is entered.

In step 905, the lens controller 31 determines the drive direction and drive speed of the zoom ring drive motor 5 based on the zoom direction and zoom speed information sent from the camera controller in step 902.

The lens controller 31 then drives the zoom ring drive motor 5 in and at the zoom direction and zoom speed set in step 905. The zoom ring 1 is thereby rotated and the following operation is carried out.

FIG. 3 illustrates the operation that the lens controller 21 performs when the variator lens unit 6 and the focus lens unit 7 are moved in accordance with the rotation (displacement) of the zoom ring 1. The operation of FIG. 3 is performed in both the case where the zoom ring 1 is rotated by the driving of the zoom ring drive motor 5 in accordance with the operation of the zoom key 16 (power zoom operation) as described above and the case where the zoom ring 1 is manually operated by the operator, and the operation is performed by the lens controller 31.

In FIG. 3, the present flow is started in step 301 when the power of the camera is turned ON. In step 302, the lens controller 31 reads, at the sampling period, the output (position information) of the absolute rotation position encoder 8 and the output (position information) of the zoom encoder 13, and calculates the difference between these outputs. Here, the "difference" is the same as that described for Embodiment 1.

In step 303, the lens controller 31 judges whether or not the difference calculated in step 302 is of a magnitude that is equal to or more than a predetermined value that was set priorly in consideration of the allowable error in the same manner as in Embodiment 1 (judges whether or not there is a difference). When there is a difference, that is, when the position of the zoom ring 1 (focal length indication) and the position of the variator lens unit 6 are in a state that deviates from the "relationship (correspondence) that should hold", step 305 is entered.

In step 305, the zoom motor 12 is driven in the direction of eliminating (decreasing) the difference at a speed that is in accordance with the magnitude of the difference. At the same time, for the zoom tracking operation (compensator operation), the focus motor 14 is driven to move the focus lens unit 7. Thereafter a return to step 302 is performed.

In step 302, the output of the absolute rotation position encoder 8 and the output of the zoom encoder 13 are read again to judge whether or not there is a difference between the two. When it is judged that there is no difference, step 304 is entered and the zoom motor 12 and the focus motor 14 are stopped. The state in which zoom movement of the optical system (variator lens unit 6 and focus lens unit 7) is carried out to a focal length corresponding to the focal length indication after rotation (displacement) of the zoom ring 1 is thereby attained.

The operation of the flowchart shown in FIG. 3 is performed constantly (at the sampling period), and even if the zoom key 16 or the focus ring 21 is not operated, the operation is performed immediately when the position information from the absolute rotation position encoder 8 and the position information from the zoom encoder 13 deviates from the "relationship that should hold."

With the present embodiment, the position information on the zoom ring 1 that is detected by the absolute rotation position encoder 8, that is, the information indicating the current focal length, is communicated from the lens controller 31 to the camera controller 32 via the contact 36. The camera controller 32 receives this information and displays information concerning the focal length on the EVF 33.

The display on the EVF 33 is not limited to this embodiment's camera system but may also be applied to the image-taking apparatuses of the Embodiments 5 and 6.

The state in which zoom operator of the optical system (variator lens unit 6 and focus lens unit 7) is carried out to a position corresponding to the position of the zoom ring 1 is maintained with the present embodiment as well. The focal length indication at the zoom ring 1 and the actual focal length state of the optical system can thus be put constantly in a substantially corresponding state of low deviation and the focal length can be maintained as it is indicated by the zoom ring 1 and the EVF 33.

Though the zooming operation was described with the present embodiment, the same control as that described for Embodiment 6 may also be applied to the focusing operation of a camera system such as that of the present embodiment. In this case, the camera controller 32 is made to function as a signal output unit that sends a signal for moving the focus lens unit 7 (signal to be used for focusing) to the lens controller 31 based on the video signal from the signal processing/recording system 41, and the lens controller 31 is made to drive the focus ring (21 of FIG. 10) in response to this signal under the condition that the clutch mechanism 58 is in the transmitting state.

Also, though with the above-described Embodiments 5 to 7, cases were described where ring-shaped members are used as the operating members indicated as the zoom ring 1 and the focus ring 21, a scale is formed on each such operating member, and a mark is provided on the fixed side to indicate the focal length or in-focus distance, the operating members of the present invention are not limited thereto and may be operating members of other forms as long as the operating range (movable range) is limited by mechanical ends structured by stoppers. For example, an operating member, such as a knob that slides rectilinearly, etc., may also be used.

Also, though with the respective embodiments described above, structures are made to make the indications of the focal length and the in-focus distance on the operating members be matched constantly with the actual focal length and in-focus distance of the optical system, it is sufficient that structures be made so that predetermined positions within the operating ranges of the operating members be matched with the states (positions of the lens units) of the optical system.

(Embodiment 8)

Figure 13:
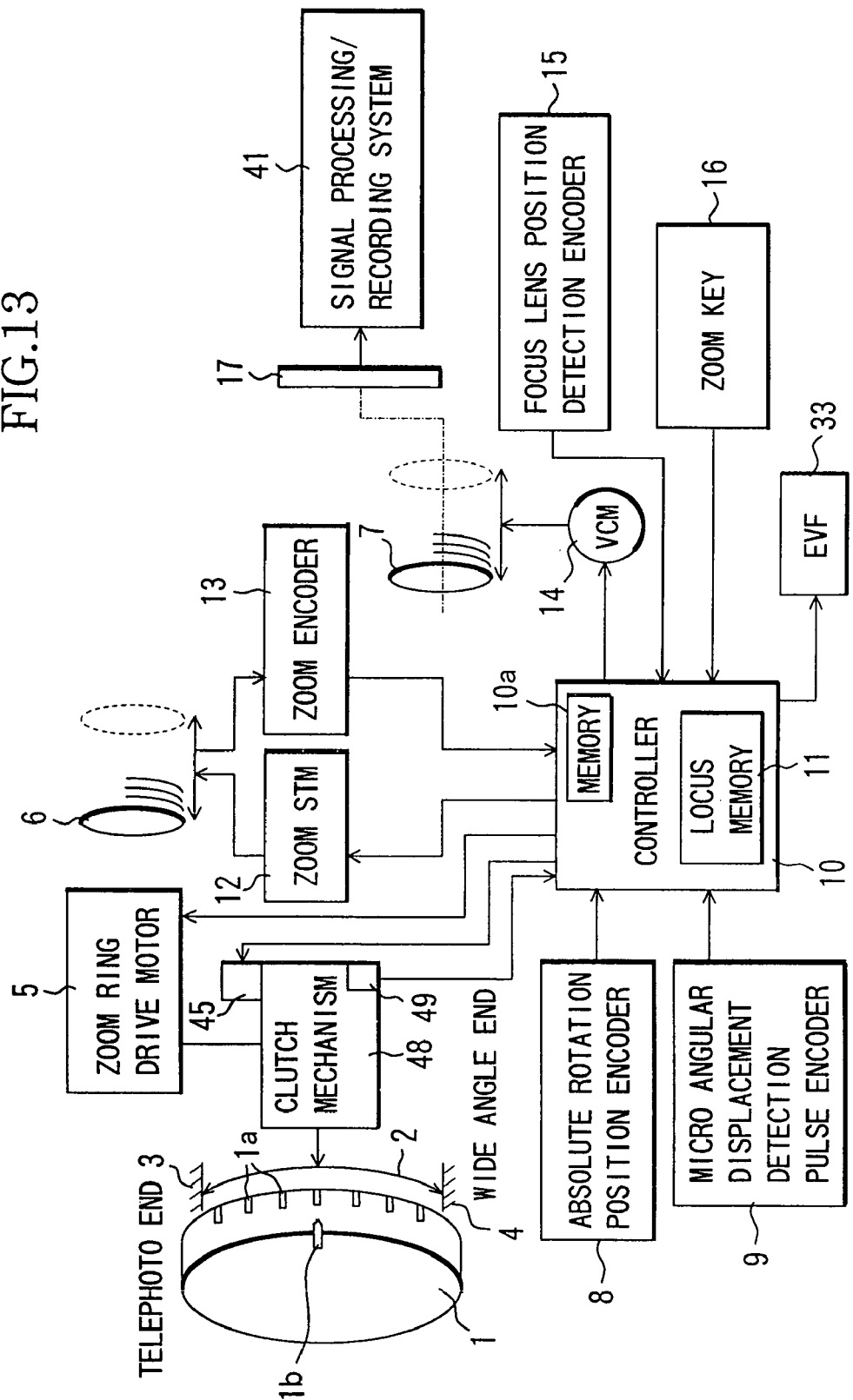
FIG. 13 is a block diagram showing the structure of an image-taking apparatus of Embodiment 8 of the present invention.

FIG. 13 shows a block diagram for describing an image-taking apparatus (optical apparatus), which is Embodiment 8 of the present invention. This embodiment is an example wherein the invention is applied to a zoom mechanism of a digital still camera, video camera, or other image-taking apparatus equipped with a rear focus zoom lens optical system. Whereas with Embodiments 4 to 7 described above, cases were described in which a clutch mechanism is switched manually or in accordance with a switch operation by the operator, with the present embodiment, an automatic switching unit is provided.

This embodiment has an automatic switching unit (switching drive unit) 45 for the clutch mechanism 48 added to the image-taking apparatus shown in FIG. 8, and the components that are in common to those of Embodiment 5 are provided with the same Reference numerals and description thereof shall be omitted.

The clutch mechanism 48 is the same as that described for Embodiment 5 and can be switchingly operated from a transmitting state to a non-transmitting state and from the non-transmitting state to the transmitting state by manual operation of a lever by an operator or by an actuator drive that is carried out in accordance with a switch operation by the operator. In the present embodiment, the switching from the non-transmitting state to the transmitting state can also be performed by the automatic switching unit 45.

In the case where the clutch mechanism 48 is switched by an operating lever, automatic switching unit 45 comprises a switching drive actuator, which is mechanically connected to the operating lever, and a circuit that drives the switching drive actuator in accordance with a switching signal received from the controller 10. In a case where the clutch mechanism 48 is switched by an actuator drive in accordance with a switch operation, a circuit, which, regardless of the operation of the switch, drives the actuator of the clutch mechanism 48 in accordance with the switching signal received from the controller 10, is included.

Figure 14:
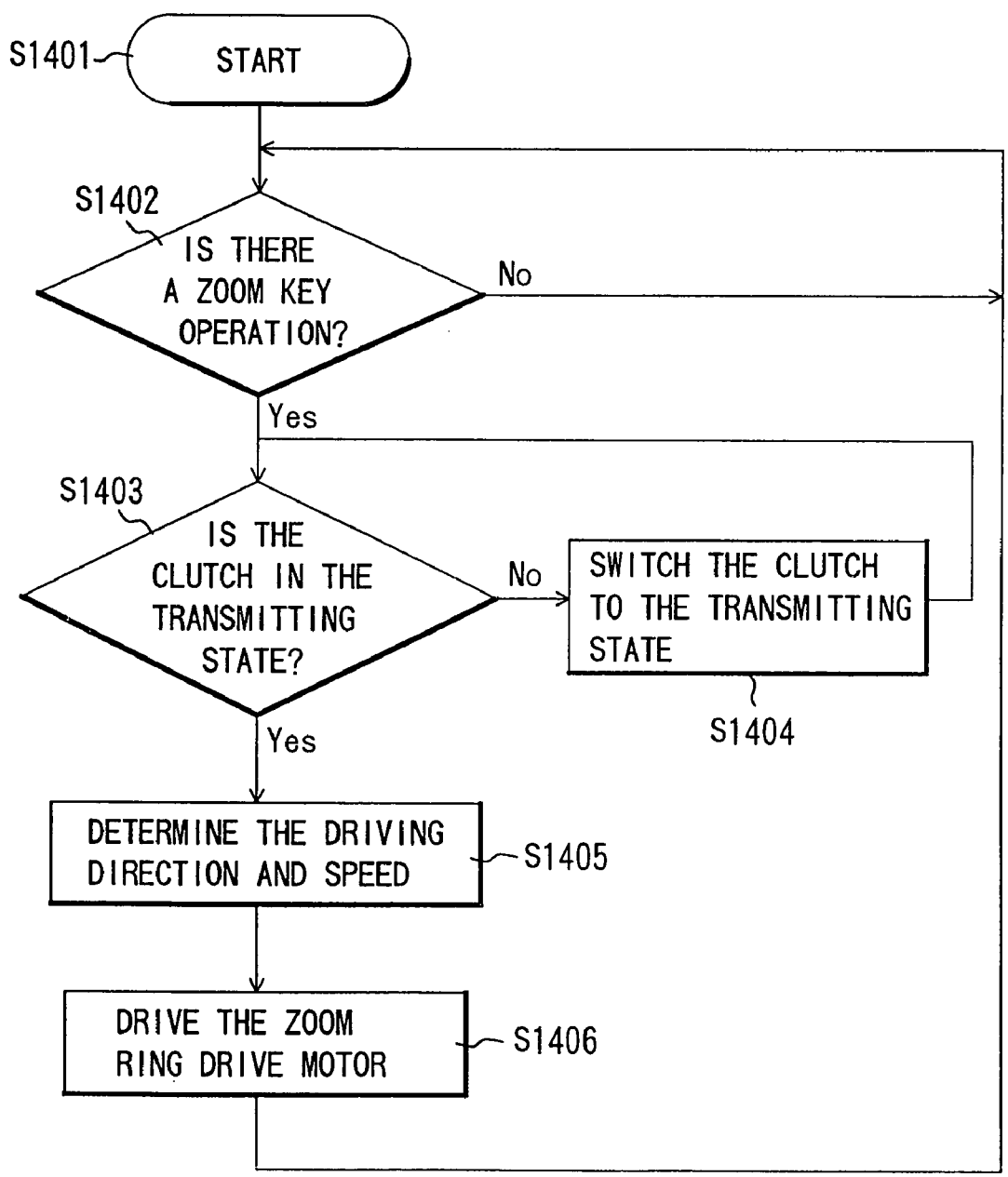
FIG. 14 is a flowchart illustrating the operation of the image-taking apparatus of Embodiment 8.

FIG. 14 is a flowchart illustrating the operation of the controller 10 that is performed in relation to the operation of a zoom key 16 (power zoom operation) and include the switching operation by the automatic switching unit 45 of the clutch mechanism 48.

In FIG. 14, the present operation is started from step 1401 when the power of the image-taking apparatus is turned ON. In step 1402, the controller 10 detects whether or not operation of the zoom key 16 is occurred (whether or not a signal is input from the zoom key 16). When operation of the zoom key 16 is occurred, the controller 10 proceeds to step 1403.

In step 1403, the signal from the clutch detection switch 49 is checked to judge whether or not the clutch mechanism 48 is in the transmitting state. When the clutch mechanism 48 is judged to be in the transmitting state, step 1405 is entered. On the other hand, when the clutch mechanism 48 is judged to be in the non-transmitting state, the switching signal is output to the automatic switching unit 45 and the clutch mechanism 48 is switched from the non-transmitting state to the transmitting state. Thereafter, a return to step 1403 is performed. When whether or not the clutch mechanism 48 is in the transmitting state is then judged again from the signal from the clutch detection switch 49 in step 1403, since the clutch mechanism will now be in the transmitting state, step 1405 is entered.

In step 1405, the controller 10 detects the sign (operation direction) and magnitude (operation amount) of the signal from the zoom key 16 and accordingly determines the drive direction and drive speed of the zoom ring drive motor 5.

In step 1406, the zoom ring drive motor 5 is driven in and at the drive direction and drive speed determined in step 1405. The zoom ring 1 is thereby rotated, and the operation described for Embodiment 1 using FIG. 3 or the operation illustrated by the flowchart of FIG. 15, which shall be described later for Embodiment 9, are carried out.

Thus with the present embodiment since when the signal from the zoom key 16 is input (when the power zoom operation is performed) during the clutch mechanism 48 is in the non-transmitting state, the clutch mechanism 48 is automatically switched to the transmitting state. The operator is thereby not forced to perform the clutch switching operation. The operability of the image-taking apparatus can thus be improved. Also, even when an operator operates the zoom key 16 without noticing that the clutch mechanism 48 is in the non-transmitting state, the power zoom operation can be executed, thereby enabling the taking of an image in accordance with the intention of the operator.

Though an integral lens type image-taking apparatus was described for the present embodiment, the same automatic switching of the clutch mechanism may be carried out in an interchangeable lens apparatus in a camera system such as that described with Embodiment 7. Also, though the zooming operation was described with the present embodiment, the automatic switching of the clutch mechanism may also be applied to the focusing operation described with Embodiment 6.

(Embodiment 9)

With each of Embodiments described above, when an operator performs a manual operation to make the zooming operation be performed, the zooming operation can be performed regardless of whether the clutch mechanism 48 is in the non-transmitting state or in the transmitting state. However, as was described with Embodiment 1, since the rotational torque of the zoom ring 1 is controlled by grease, etc., so that a good manual operation sensation will be provided, if, when manual operation of the zoom ring 1 is performed, the good manual operation sensation is to be provided always, the clutch mechanism 48 must be put in the non-transmitting state.

However, if the clutch mechanism 48 is structured to be switched by the operation of the operator, since the switching operation is troublesome, etc., there will be an inadequacy in terms of ease of use.

Thus with the present embodiment, structures are made so that when manual operation of the zoom ring 1 is performed when the clutch mechanism 48 is in the transmitting state, the clutch mechanism 48 is switched to the non-transmitting state automatically.

Though the structure of this embodiment's image-taking apparatus is basically in common to that of Embodiment 8 shown in FIG. 13, with the present embodiment, the automatic switching unit 45 performs the operation of switching the clutch mechanism 48 from the transmitting state to the non-transmitting state. The operation of the present embodiment's image-taking apparatus shall now be described using FIGS. 13 and 15 in combination.

Figure 15:
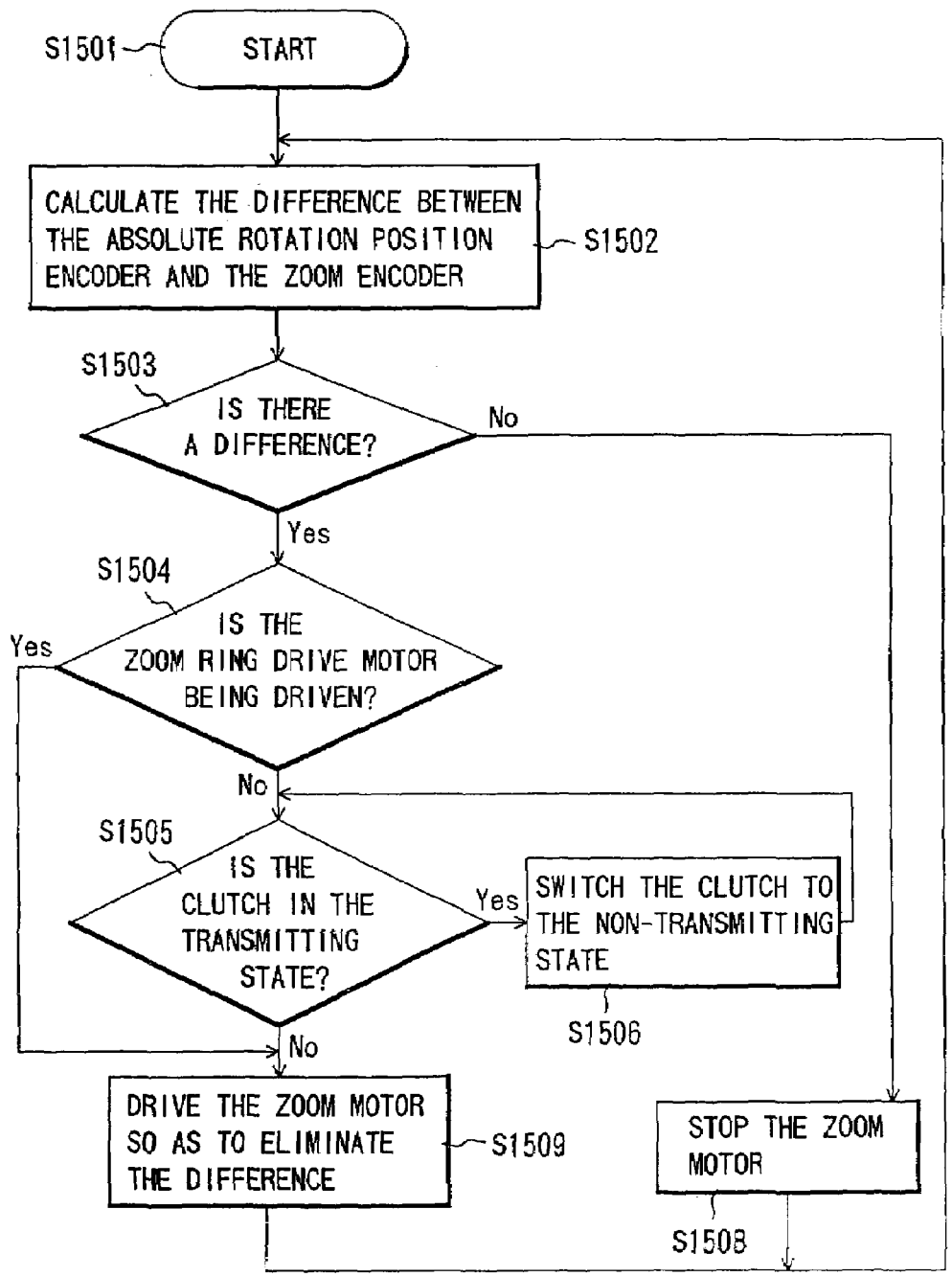
FIG. 15 is a flowchart illustrating the operation of the image-taking apparatus of Embodiment 9.

FIG. 15 is a flowchart illustrating the operation of the controller 10 that is performed in relation to a zooming operation performed in accordance with the rotation (displacement) of the zoom ring 1 and includes the switching operation by the automatic switching unit 45 for the clutch mechanism 45 in the image-taking apparatus that is Embodiment 9 of the present invention.

In FIG. 15, the present operation is started from step 1501 when the power of the image-taking apparatus is turned ON.

In step 1502, the controller 10 reads, at the sampling period, the output (position information) of the absolute rotation position encoder 8 and the output (position information) of the zoom encoder 13, and calculates the difference between these outputs. Here, the "difference" is the same as that described for Embodiment 1.

In step 1503, the controller 10 judges whether or not the difference calculates in step 1502 is of a magnitude that is equal to or more than a predetermined value that was set priorly in consideration of the allowable error in the same manner as in Embodiment 1 (judges whether or not there is a difference). When there is a difference, that is, when the position of the zoom ring 1 (focal length indication) and the position of the variator lens unit 6 are in a state that deviates from the "relationship (correspondence) that should holds", step 1504 is entered.

In step 1504, the controller 10 judges whether or not the zoom ring drive motor 5 is being driven. This is done so as not to perform the below-described switching of the clutch mechanism 48 from the transmitting state to the non-transmitting state when the zoom ring drive motor 5 is being driven and the zoom ring 1 is being rotated due to operation of the zoom key 16. Here, the judgment of whether or not the zoom ring drive motor 5 is being driven may be made by judging whether or not the controller 10 is outputting a drive signal to the zoom ring drive motor 5. The judgment may also be made by judging whether or not a signal is being input from the zoom key 16 (whether or not the zoom key 16 is being operated).

When the zoom ring drive motor 5 is not being driven, step 1505 is entered while when the zoom ring drive motor 5 is being driven, a skip to step 1509 is performed.

In step 1505, the signal from the clutch detection switch 49 is checked to judge whether or not the clutch mechanism 48 is in the transmitting state. When the clutch mechanism is judged to be in the non-transmitting state, step 1509 is entered as it is. On the other hand, when the clutch mechanism is judged to be in the transmitting state, step 1506 is entered.

In step 1506, the switching signal is output to the automatic switching unit 45 and the clutch mechanism 48 is switched from the transmitting state to the non-transmitting state. Thereafter, a return to step 1505 is performed.

When whether or not the clutch mechanism 48 is in the transmitting state is then judged again from the signal from the clutch detection switch 49 in step 1505, since the clutch mechanism will now be in the non-transmitting state, step 1509 is entered.

In step 1509, the zoom motor 12 is driven in the direction of eliminating (decreasing) the difference at a speed that is in accordance with the magnitude of the difference. At the same time, for the zoom tracking operation (compensator action), the focus motor 14 is driven to move the focus lens unit 7 as described above. Thereafter a return to step 1502 is performed.

In step 1502, the output of the absolute rotation position encoder 8 and the output of the zoom encoder 13 are read again to judge whether or not there is a difference between the two, and when it is judged that there is no difference, step 1508 is entered and the zoom motor 12 and the focus motor 14 are stopped. The state in which zoom operation of the optical system (variator lens unit 6 and focus lens unit 7) is performed to a focal length corresponding to the focal length indication after rotation (displacement) of the zoom ring 1 is thereby attained.

The operation of the flowchart shown in FIG. 15 is performed constantly (at the sampling period), and even if the zoom key 16 or the zoom ring 1 is not operated, these operation is performed immediately when the position information from the absolute rotation position encoder 18 and the position information from the zoom encoder 13 deviates from the "relationship that should hold."

Thus with the present embodiment, since when an operator operates the zoom ring 1 manually to perform zooming, the clutch mechanism 48 is switched automatically from the transmitting state to the non-transmitting state without forcing the operator to perform the clutch switching operation, the rotational load of the zoom ring drive motor 5 is not applied during manual operation of the zoom ring 1 and a good manual operation sensation can be provided.

Though an integral lens type image-taking apparatus was described for the present embodiment, the same automatic switching of the clutch mechanism may be carried out in an interchangeable lens apparatus in a camera system such as that described with Embodiment 7. Also, though the zooming operation was described with the present embodiment, the automatic switching of the clutch mechanism may also be applied to the focusing operation described with Embodiment 6.

Also, though with each of Embodiments 5 to 9, an image-taking apparatus or lens apparatus using a rear focus (inner focus) zoom lens having a 4-unit lens structure was described, these embodiments may also be applied to image-taking apparatuses or lens apparatuses using the optical systems of front focus type zoom lenses and of multiple lens unit rear focus (inner focus) zoom lenses with 3 lens units or 5 lens units, etc.

As described above, with Embodiments 5 to 9, an optical apparatus or lens apparatus can be provided with which the correspondence between the position of an operating member and the position of a movable lens can maintained, the saving of electrical power can be promoted, and image taking errors can be restrained.

(Embodiment 10)

Figure 16:
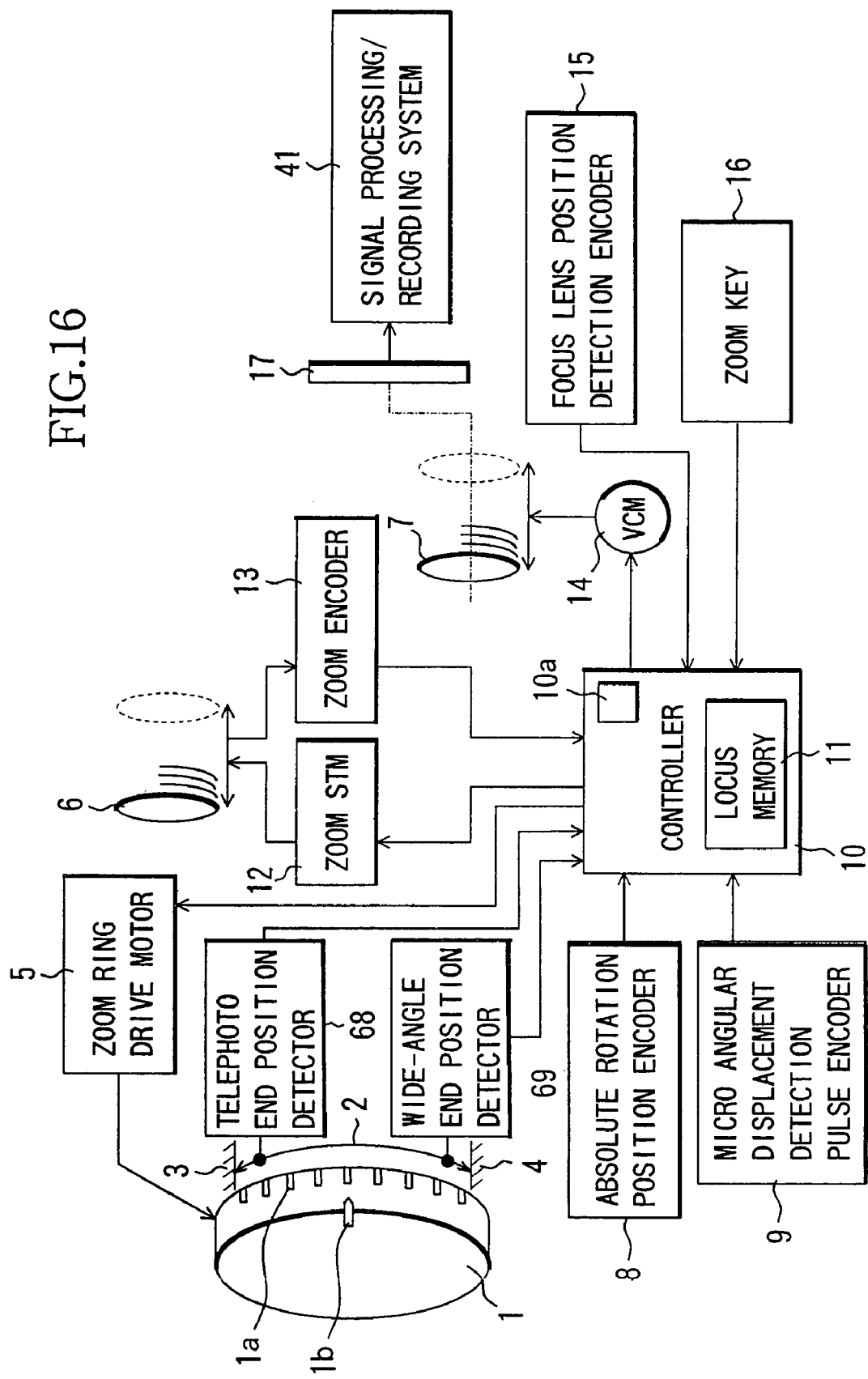
FIG. 16 is a block diagram showing the structure of an image-taking apparatus of Embodiment 10 of the present invention.

FIG. 16 shows a block diagram for describing an image-taking apparatus (optical apparatus) that is Embodiment 10 of the present invention. This embodiment is an example wherein the invention is applied to a zoom mechanism of a digital still camera, video camera, or other image-taking apparatus equipped with a rear focus zoom lens optical system. With this embodiment's image-taking apparatus, a camera body part is provided with an integral lens part. The basic structure of this embodiment's image-taking apparatus is the same as that described for Embodiment 1, and the components that are in common to those of Embodiment 1 are provided with the same Reference numerals and description thereof shall be omitted.

Figure 17:
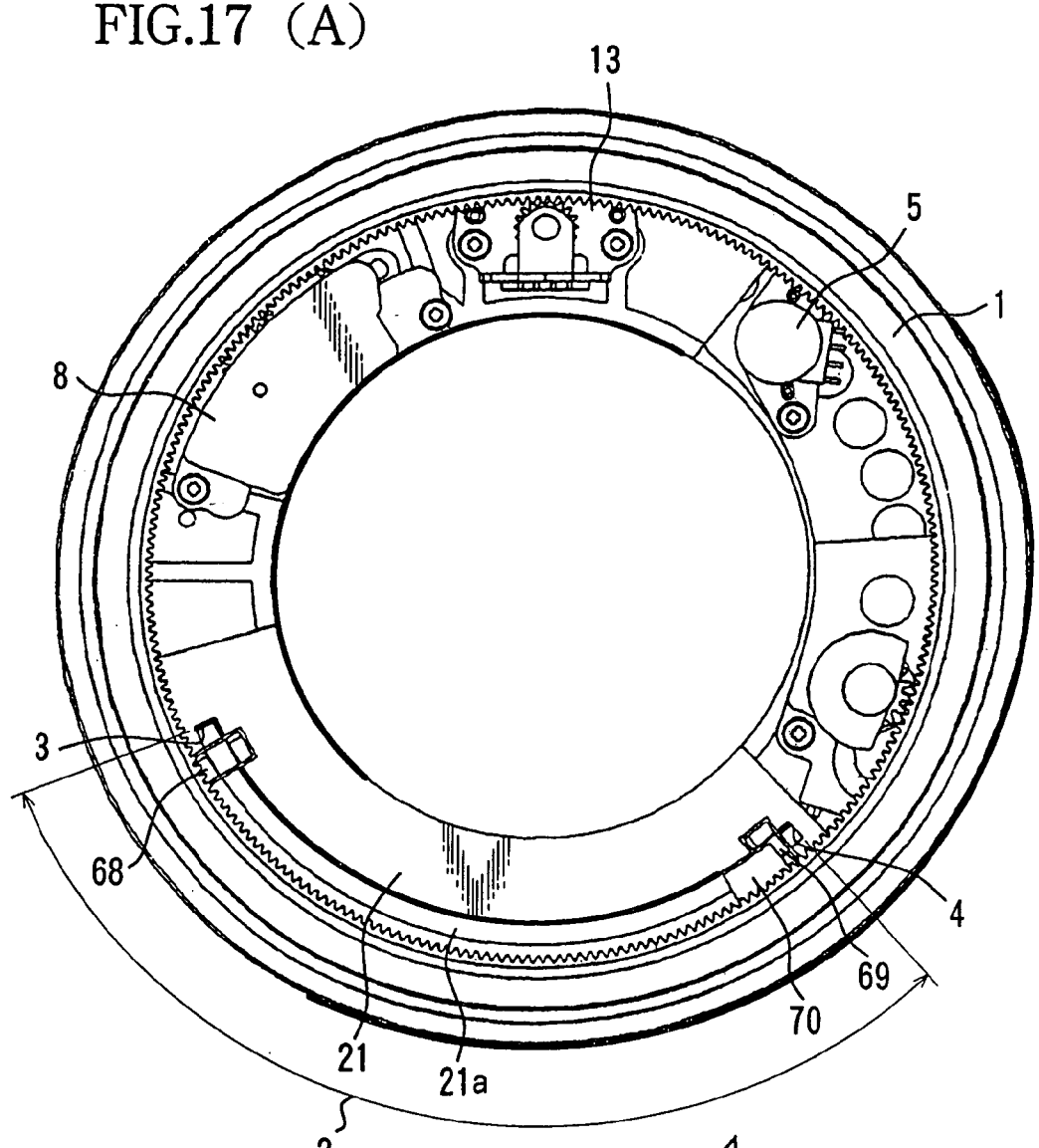
FIG. 17(A) is a front view of a lens part of the image-taking apparatus of Embodiment 10 and FIG. 17(B) is an enlarged view of the same part.
Figure 17:
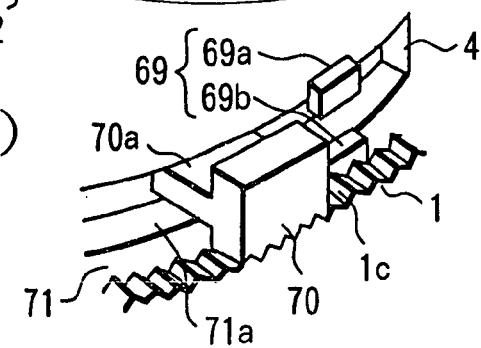

FIG. 17(A) is a front view of the lens part and FIG. 17(B) shows a part of this front view in enlarged manner.

In its rotatable range (movable range, hereinafter indicated by Reference numeral 2), the zoom ring 1 is restricted in the range of rotation by mechanical contact with a telephoto end stopper (mechanical end; hereinafter indicated by the Reference numeral "3") at the telephoto end side at which the focal length (zoom position) is the longest focal length and with a wide-angle end stopper (mechanical end; hereinafter indicated by the Reference numeral 4) at the wide end side at which the focal length is the shortest focal length. The rotation angle of this zoom ring 1 is set in the rotatable range 2, for example, of approximately 90° to 120°.

Also at the inner side of the rotatable range 2 of the zoom ring 1, a telephoto end position detector 68 is disposed at a position corresponding to the telephoto end at which the focal length (zoom position) is the longest focal length and a wide-angle end position detector 69 is disposed at a position corresponding to the wide-angle end at which the focal length is the shortest focal length. The telephoto end position detector 68 and the wide-angle end position detector 69 are provided to detect that the zoom ring 1 is positioned at the rotation position corresponding to the optical telephoto end of the variator lens 6 and to detect that the zoom ring 1 is positioned at the rotation position corresponding to the optical wide angle end of the variator lens 6, respectively, and non-contacting type detectors (for example, photointerrupters) and contacting type detectors (for example, micro switches) may be used. With the present embodiment, a description shall be provided for the case where photointerrupters are used as these end position detectors 68 and 69 as the detectors.

The positions of the zoom ring 1 that are detected by the telephoto end position detector 68 and the wide-angle end position detector 69 are set at inner sides of the rotatable range 2 of the zoom ring 1 so that predetermined intervals are provided with respect to the positions at which rotation is stopped by the telephoto end stopper 3 and wide-angle end stopper 4. Thus dead zones, in which the zoom ring 1 can be rotated, are left between the position at which the zoom ring 1 is detected by the telephoto end position detector 18 and the position at which the rotation is stopped by the telephoto end stopper 3 and between the position at which the zoom ring 1 is detected by the wide-angle end position detector 19 and the position at which the rotation is stopped by the wide end stopper 4. In other words, the telephoto end position detector 68 and the wide-angle end position detector 69 themselves are positioned apart from the positions of the telephoto end stopper 3 and the wide-angle end stopper 4, respectively, in the lens circumference direction.

The controller 10 stores, in a memory 10a inside the controller 10, the position information, which is the output signal output from the absolute rotation position encoder (a potentiometer in the present embodiment) 8 at the time the zoom ring 1 is detected via these end position detectors 68 and 69 as being positioned at the telephoto end corresponding position or at the wide-angle end corresponding position by the end position detector 68 or 69, as an absolute position of the zoom ring 1 in the rotatable range 2.

Here, as shown in FIGS. 17(A) and (B), at a lower part of a fixed member (a member that supports the respective lens units, motors, encoders, etc., mentioned above and has the zoom ring 1 provided on its outer periphery) 71 of the lens part, an arcuate groove portion 71a of a length corresponding to the rotatable range 2 of the zoom ring 1 is formed so as to open towards the front. The inner end surfaces of the respective sides in the circumferential direction of this groove portion 71a become the telephoto end stopper 3 and the wide-angle end stopper 4.

Reference numeral 70 is a ring side stopper. As shown in detail in FIG. 17(B), a planar protrusion 70a, which is inserted inside the groove portion 71a, is formed on this ring side stopper 70. This ring side stopper 70 is fixed by adhesion, etc., to one location of a gear portion 1c that is formed on the inner periphery of the zoom ring 1. Thus when the zoom ring 1 rotates, the ring side stopper 70 also rotates and the protrusion 70a moves inside the groove portion 71a.

The protrusion 70a has the role of contacting the telephoto end stopper 3 or the wide-angle end stopper 4 when the zoom ring 1 rotates to the telephoto end or the wide angle end and thereby stopping further rotation of the zoom ring 1. Furthermore, the protrusion 70a has the role of blocking the light directed from a light projecting portion 69a to a light receiving portion 69b of the telephoto end or wide-angle end position detector 68 and 69 (of which only the wide-angle end position detector 69 is shown in FIG. 17(B)) by interposing between the light projecting portion 69a and the light receiving portion 69b before contacting the telephoto end stopper 3 or wide-angle end stopper 4.

When the protrusion 70a is not blocking the light from the light projecting portion 69a (when the zoom ring 1 is positioned at the inner side of the positions detected by the telephoto end and wide-angle end position detectors 68 and 69 in the movable range 2), the light receiving portion 69b outputs an ON signal.

Also, when the protrusion 70a blocks the light from the light projection portion 69a, the light receiving portion 69b outputs an OFF signal.

The controller 10 detects that the zoom ring 1 is positioned at the position at which the telephoto end or wide-angle end position detector 68 or 69 is disposed by means of this OFF signal.

The protrusion 70a has the required width in the direction of rotation of the zoom ring 1 and the required thickness for securing the strength as a stopper, and by an end portion in the width direction of the protrusion 70a reaching the interval between the light projecting portion 69a and the light receiving portion 69b, the light from light projecting portion 69a to the light receiving portion 69b is blocked. This position is the optical end (telephoto end or wide angle end) corresponding position at which the zoom ring 1 is detected by the telephoto end or wide-angle end position detector 68 or 69.

Thereafter, even if the zoom ring 1 is rotated further in the dead zone until the protrusion 70a contacts the telephoto end or wide-angle end stopper 3 or 4, the light from the light projecting portion 69a to the light receiving portion 69b remains blocked.

As shown in FIG. 17(A), the output gear of the zoom ring drive motor 5 is engaged with the gear portion 1c and the driving force of the zoom ring drive motor 5 is transmitted to the zoom ring 1 via this gear part 1c. Also, the rotation input gears of the absolute rotation position encoder 8 and the zoom encoder 13 are also engaged with the gear portion 1c so that the rotation of the zoom ring 1 are transmitted to these encoders 8 and 13.

Since the basic operation of the image-taking apparatus of this embodiment is the same as the operation of Embodiment 1 described using FIGS. 2 and 3, description thereof shall be omitted.

As with Embodiment 1, the state in which zooming operation of the optical system (variator lens unit 6 and focus lens unit 7) is performed to a position corresponding to the position of the zoom ring 1 is maintained with the present embodiment as well. The focal length indication of the zoom ring 1 and the actual state of the focal length of the optical system can thus be put constantly in a substantially corresponding state of low deviation so as to enable the focal length to be maintained as it is indicated.

However, with Just the structure, output variation of the absolute rotation position encoder (potentiometer) 8 due to temperature change (temperature drift phenomena) and variations of the positions detected by the absolute rotation position encoder 8 of the zoom ring 1 that arise due to thermal expansion or thermal shrinkage of component parts cannot be restrained. The countermeasure described below is thus provided in the present embodiment.

Figure 18:
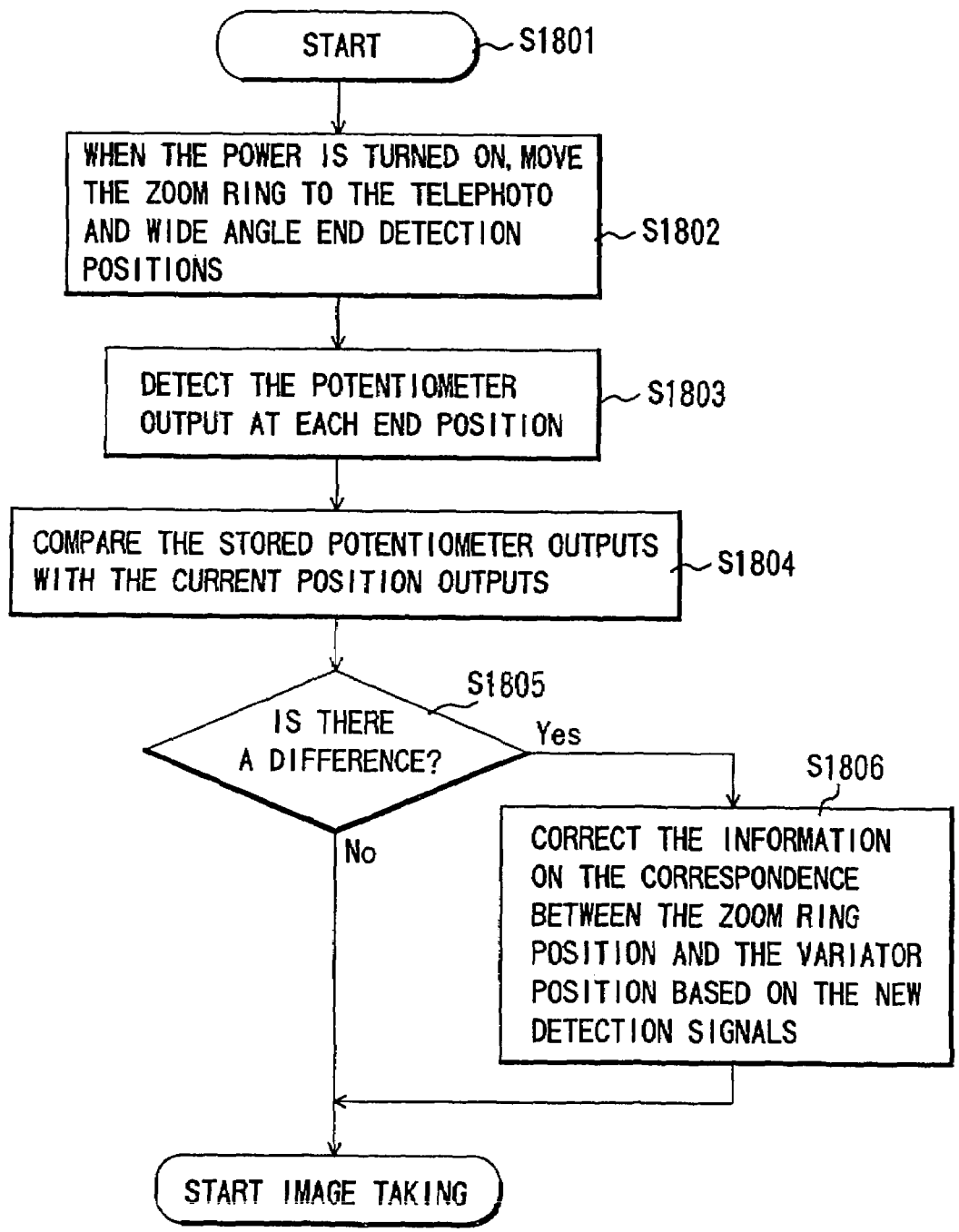
FIG. 18 is a flowchart illustrating the operation of the image-taking apparatus of Embodiment 10.

FIG. 18 is a flowchart illustrating the operation of the controller 10 for restraining variations of the detected positions of the zoom ring 1 due to temperature change.

In FIG. 18, the present operation is started in step 1801 when the power of the image-taking apparatus is turned ON. In step 1802, the controller 10 drives the zoom ring drive motor 5 to rotate the zoom ring 1 to the telephoto end side (or to the wide angle end side) and continues doing so until the OFF signal is input from the telephoto end position detector 68 (or the wide-angle end position detector 69). Upon detection of the OFF signal from the telephoto end position detector 68, the controller 10 stores the output from the absolute rotation position encoder 8 (the position information on the zoom ring 1) at this time in the memory 10a.

A return to step 1802 is then performed and this time, the zoom ring drive motor 5 is driven in the reverse direction to rotate the zoom ring 1 to the wide-angle end side (or the telephoto end side) and this is continued until the OFF signal is input from the wide angle end position detector 69 (or the telephoto end position detector 68). Upon detection of the OFF signal from the wide-angle end position detector 69, the controller 10 stores the output from the absolute rotation position encoder 8 at this time in the memory 10a. In the figure, this repetition of steps 1802 and 1803 twice is indicated by dotted lines and an arrow. Step 1804 is then entered.

In step 1804, the outputs (position information on the zoom ring 1), which were output from the absolute rotation position encoder 8 at the points at which the zoom ring 1 was detected by the telephoto end and wide-angle end position detectors 68 and 69 respectively and were stored in step 1803, are compared with reference outputs (reference positions). The reference outputs are outputs which were output from the absolute rotation position encoder 8 at the points at which the zoom ring 1 was detected by the telephoto end and wide-angle end position detectors 68 and 69 respectively and were stored priorly in the memory 10a at the time of shipment from a factory or at the time of previous use, etc.

Then in step 1805, it is judged whether or not there are any differences between the compared outputs that exceed an allowable error (set to an error that is allowable optically or in consideration of the error due to the detection dead zone, etc., of the encoder 8). When there are no differences, image taking is started as it is. Specifically, the operations illustrated in FIGS. 2 and 3 for Embodiment 1 are started. On the other hand, when the difference exists, step 1806 is entered.

In step 1806, the outputs, which were output from the absolute rotation position encoder 8 at the points at which the zoom ring 1 was detected by the telephoto end and wide-angle end position detectors 68 and 69 respectively and were stored in the current step 1803, are stored in the memory 10a as new reference position information.

Furthermore, based on the new reference position information, the controller 10 corrects the data or calculation formulae that are the information that indicate the above-described "relationship (correspondence) that should hold" for the output of the absolute rotation position encoder 8 (position information on the zoom ring 1) and the output of the zoom encoder 13 (position information on the variator lens unit 6).

Specifically, if, as the information on the "relationship that should hold", the data on the converted positions of the variator lens unit 6 that correspond to the respective positions of the zoom ring 1 with respect to the reference positions of the zoom ring 1 are stored, for example, the converted position data of the variator lens unit 6 that correspond to the respective positions of the zoom ring 1 are increased or decreased in accordance with the differences between the new reference position information and the previous reference position information.

Also, if, as the information on the "relationship that should hold", formulae for calculating the converted positions of the variator lens unit 6 that correspond to respective positions of the zoom ring 1 with respect to the reference positions of the zoom ring 1 are stored, for example, the coefficients of the respective formulae mentioned above are increased or decreased in accordance with the differences between the new reference position information and the previous reference position information.

By thus correcting the information on the "relationship that should hold", even when the output of the absolute rotation position encoder 8 varies due to a temperature drift or when component parts undergo deformation by thermal expansion or thermal shrinkage, the correspondence between the position of the zoom ring 1 (focal length indication) and the position of the variator lens unit 6 (focal length of the optical system) can be maintained.

By performing such a correction operation each time the power of the image-taking apparatus is turned ON, the correspondence between the position of the zoom ring 1 and the position of the variator lens unit 6 can be maintained each time the image-taking apparatus is used.

Though with the present embodiment, the above-described correction operation is carried out when the power of the image-taking apparatus is turned ON, the correction operation may also be carried out when during image taking, the zoom ring 1 is detected by the telephoto end or wide-angle end position detector 68 or 69. Temperature changes during image taking can thus be accommodated for more finely.

Furthermore, though with the present embodiment, the information on the "relationship that should hold" is corrected based on the position information (reference position information) of the zoom ring 1 at the points at which signals are input from the telephoto end and wide-angle end position detectors 68 and 69, structures may be made not to correct the information on the "relationship that should hold" but to correct, based on the above-described reference position information, the position information on the zoom ring 1 that is obtained from the absolute rotation position encoder 8 used in the drive control of the zoom motor 12. In this case, for example, the position information of the absolute rotation position encoder 8 that is used in the drive control of the zoom motor 12 is adjusted to fit the information on the "relationship that should hold" in accordance with the difference between a currently detected reference position information and a priorly detected (stored) reference position information. The correspondence between the position of the zoom ring 1 and the position of the variator lens unit 6 can likewise be maintained regardless of temperature changes in this case as well.

Though as described above, with the present embodiment, dead zones are provided between the position at which the zoom ring 1 is detected by the telephoto end position detector 18 and the position at which the rotation is stopped by the telephoto end stopper 3 and between the position at which the zoom ring 1 is detected by the wide-angle end position detector 19 and the position at which the rotation is stopped by the wide-angle end stopper 4. Deviations of the telephoto end and wide-angle end positions (position information provided by the absolute rotation position encoder 8) of the zoom ring 1 that accompany the scattering of parts dimensions and output signals of the absolute rotation position encoder 8 and variations of the output signal from the absolute rotation position encoder 8 due to temperature drift and deformation of component parts due to temperature can thereby be absorbed. Also, the problem, wherein the zoom ring 1 cannot be rotated further even though the variator lens unit 6 has not reached the optical telephoto end or the optical wide angle end, can thereby be resolved.

(Embodiment 11)

Though with Embodiment 10, an image-taking apparatus with an integral lens was described, the present invention may also be applied to a lens apparatus of a camera system (optical apparatus) structured from a camera (digital still camera, video camera) and an interchangeable lens apparatus that can be mounted to this camera.

Figure 19:
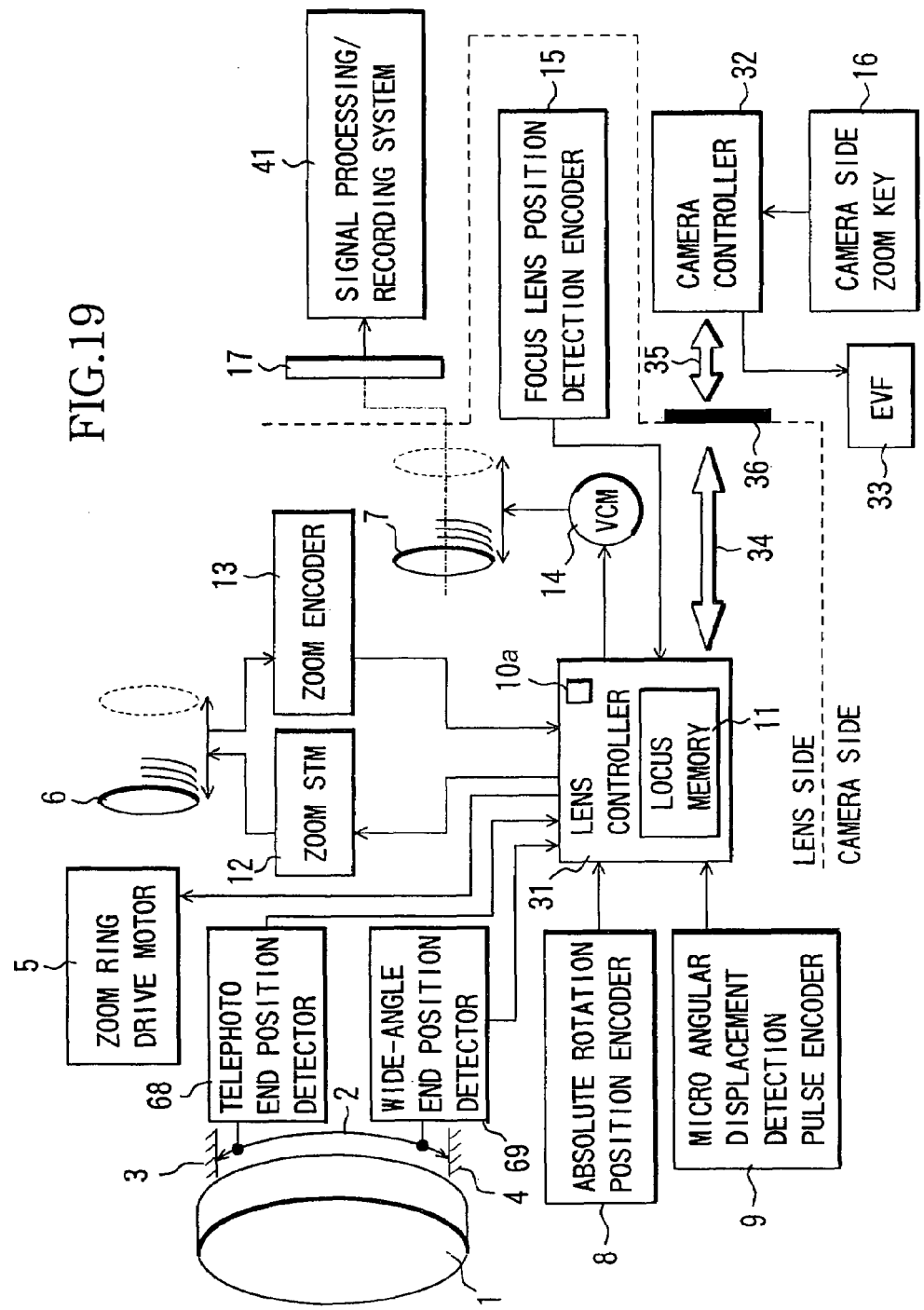
FIG. 19 is a block diagram showing the structure of a camera system of Embodiment 11 of the present invention.

FIG. 19 shows a block diagram for describing the camera system of the present embodiment. The component blocks are separated into those of the camera side and those of the lens side with the broken lines of FIG. 19 as the boundary and these blocks are joined by a mount part of the interchangeable lens and camera. The basic structure of this embodiment is the same as that of Embodiment 4 and the components that are in common to those of Embodiment 4 are provided with the same Reference numerals and description thereof shall be omitted.

Also, the operation of the lens controller 31 of this embodiment is the same as the operation of Embodiment 4 that was described using the flowcharts of FIGS. 2 and 3, and the operation of Embodiment 10 that was described using the flowcharts of FIG. 18.

The state in which zooming operation of the optical system (movement of the variator lens unit 6 and focus lens unit 7) is performed to a position corresponding to the position of the zoom ring 1 is maintained in this embodiment as well. The indication of the zoom ring 1 and the state of the actual focal length of the optical system can thus be put constantly in a substantially corresponding state of low deviation so as to enable the focal length to be maintained as it is indicated by the zoom ring 1 or the EVF 33.

Also, by correcting the information on the "relationship that should hold", even when the output from the absolute rotation position encoder 8 varies due to a temperature drift or when component parts undergo deformation by thermal expansion or thermal shrinkage, the correspondence between the position of the zoom ring 1 (focal length indication) and the position of the variator lens unit 6 (focal length of the optical system) can be maintained.

(Embodiment 12)

FIG. 10 shows a block diagram for describing Embodiment 12 of an image-taking apparatus of the present invention. This embodiment is an example wherein the invention is applied to a focus mechanism of a digital still camera, video camera, or other image-taking apparatus equipped with a rear focus zoom lens optical system. The basic structure of this embodiment is the same as that described with Embodiment 2 and the components that are in common to those of Embodiment 2 are provided with the same Reference numerals as those of Embodiment 2 and description thereof shall be omitted.

Figure 20:
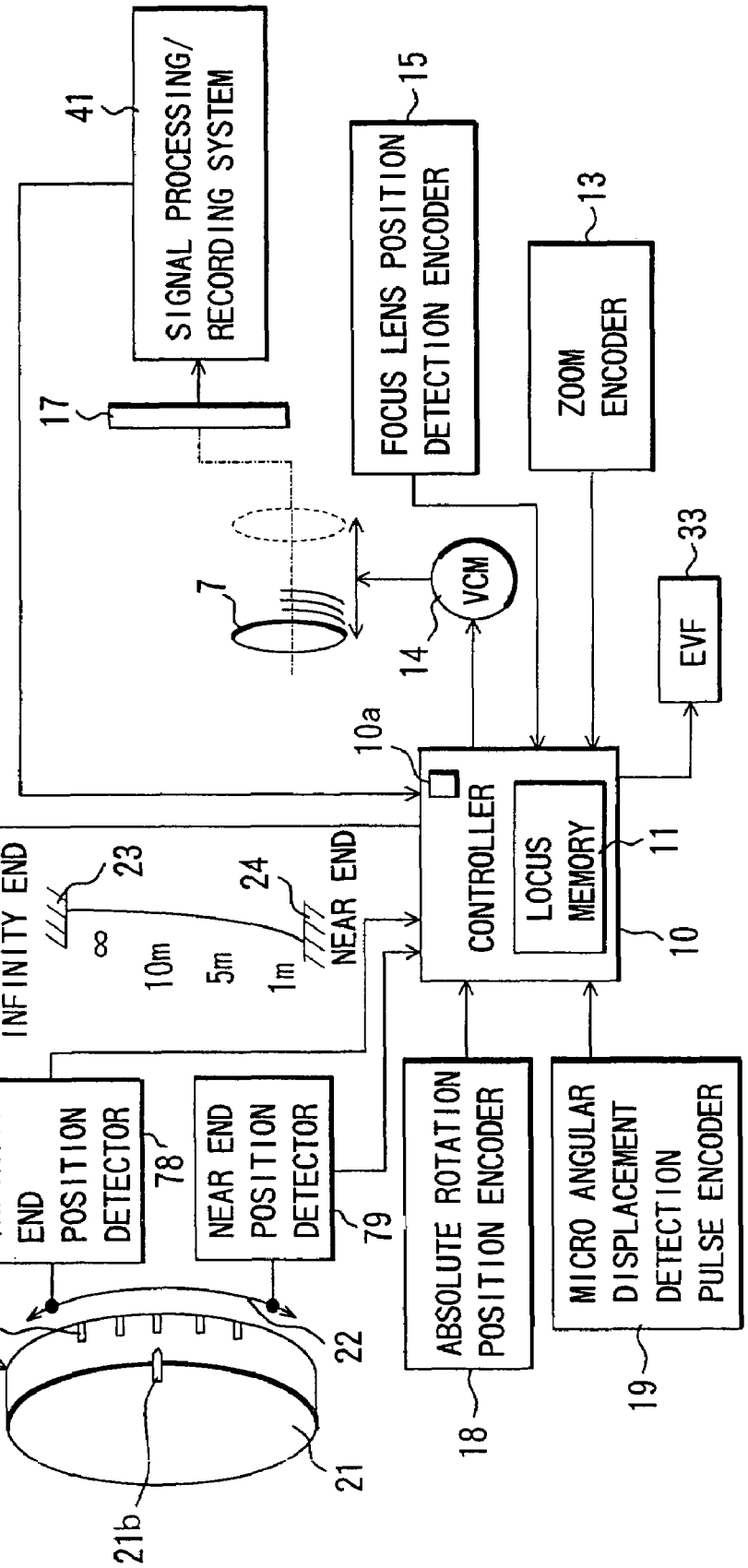
FIG. 20 is a block diagram showing the structure of an image-taking apparatus of Embodiment 12 of the present invention.

As shown in FIG. 20, the focus ring 21, like the zoom ring 1 of Embodiment 10, rotates within the rotatable range indicated by arrows 22 (movable range; hereinafter indicated by the Reference numeral, "22") and is restricted in rotation range by mechanical contact with an infinity end stopper (mechanical end; hereinafter indicated by the Reference numeral, "23") and with a near end stopper (mechanical end; hereinafter indicated by the Reference numeral, "24").

Also at the inner sides of the rotatable range 22 of the focus ring 21, an infinity end position detector 78 is disposed at a position corresponding to the infinity end and a near end position detector 79 is disposed at a position corresponding to the near end. The end position detectors 78 and 79 are provided to detect that the focus ring 21 is positioned at the rotation position corresponding to the optical infinity end (infinity end corresponding position) and to detect that the focus ring 21 is positioned at the rotation position corresponding to the optical near end (near end corresponding position), respectively. These end position detectors 78 and 79 are the same type of detectors as the telephoto end and wide-angle end position detectors 68 and 69 described for Embodiment 10.

The controller 10 stores the position information, which is the output signal from the absolute rotation position encoder (a potentiometer in the present embodiment) 18 at the point at which the focus ring 21 is detected as being positioned at the infinity end corresponding position or at the near end corresponding position via the end position detector 78 or 79, as an absolute position of the focus ring 21 in the rotatable range 22, in the memory 10a inside the controller 10.

Since the basic operation of the image-taking apparatus of the present embodiment is the same as that described for Embodiment 2 using FIGS. 5 and 6, a description thereof shall be omitted here.

The state in which the focus lens unit 7 is moved to a position corresponding to the position of the focus ring 21 is maintained with this embodiment as well. The distance indication of the focus ring 21 and the actual in-focus distance state of the focus lens 7 can thus be put constantly in a substantially corresponding state of low deviation so as to enable the in-focus distance to be maintained as it is indicated.

Also, the same form of operation for correcting the information indicating the "relationship (correspondence) that should hold" as that illustrated for Embodiment 10 in FIG. 18 is carried out with the present embodiment as well. With the present embodiment, first the focus ring drive motor 21 is driven to rotate the focus ring 21 to the infinity end side and then to the near end side, and in each case, the driving is continued until an OFF signal is input from the infinity end position detector 78 or the near end position detector 79. Upon detecting the OFF signal from the end position detector 78 or 79, the controller 10 stores the output from the absolute rotation position encoder (the position information on the focus ring 21) at that time in the memory 10a.

Next, the stored outputs (position information on the focus ring 21), which were output from the absolute rotation position encoder 18 at the points at which the focus ring 21 was detected by the infinity end and near end position detectors 78 and 79 respectively, are compared with outputs (reference position information), which were output from the absolute rotation position encoder 18 at the points at which the focus ring 21 was detected by the infinity end and near end position detectors 78 and 79 respectively and were stored priorly in the memory 10a at the time of shipment from a factory or at the time of previous use, etc.

It is then judged whether or not there are any differences between the compared outputs that exceed an allowable error (set to an error that is allowable optically or in consideration of the error due to the detection dead zone, etc., of the encoder 18). When there are no differences, image taking is started as it is.

On the other hand, when the difference exists, the currently stored outputs, which were output from the absolute rotation position encoder 18 at the points at which the focus ring 21 was detected by the infinity end and near end position detectors 78 and 79 respectively, are stored in the memory 10a as new reference position information.

Furthermore, based on the new reference position information, the controller 10 corrects the data or calculation formulae that are the information that indicate the "relationship (correspondence) that should hold" for the output of the absolute rotation position encoder 18 (position information on the focus ring 21) and the output of the focus lens position detection encoder 15 (position information on the focus lens unit 7). Specific examples of this correction are the same as those described for Embodiment 10.

By thus correcting the information on the "relationship that should hold", even when the output of the absolute rotation position encoder 18 varies due to a temperature drift or when component parts undergo deformation by thermal expansion or thermal shrinkage, the correspondence between the position of the focus ring 21 (in-focus distance indication) and the position of the focus lens unit 7 (in-focus distance of the optical system) can be maintained.

By performing such a correction operation each time the power of the image-taking apparatus is turned ON or during image taking, the correspondence between the position of the focus ring 21 and the position of the focus lens unit 7 can be maintained each time the image-taking apparatus is used.

Furthermore, with the present embodiment, dead zones are provided between the position at which the focus ring 21 is detected by the infinity end position detector 78 and the position at which the rotation is stopped by the infinity end stopper 23 and between the position at which the focus ring 21 is detected by the near end position detector 79 and the position at which the rotation is stopped by the near end stopper 24. Deviations of the infinity end and near end positions (position information provided by the absolute rotation position encoder 18) of the focus ring 21 that accompany the scattering of parts dimensions and output signals of the absolute rotation position encoder 18 and variations of the output signal from the absolute rotation position encoder 18 due to temperature drift and deformation of component parts due to temperature can thereby be absorbed.

As described for Embodiment 10, the correction operation described for the present embodiment may be replaced by the correction of the output (position information on the focus ring 21) from the absolute rotation position encoder 18.

The focusing operation and correction operation described for the present embodiment may also be applied to a lens apparatus that makes up the camera system described for Embodiment 11.

As described above, with Embodiments 10 to 12, the disruption of the correspondence between the position of an operating member and the position of a movable lens due to temperature drift of a position detector, etc., that accompanies a temperature change can be restrained to thereby maintain the correspondence between the position of the operating member and the position of the movable lens in a stable manner.

While preferred embodiments have been described it is to be understood that modification and variation of the present invention may be made without departing from the scope of the following claims.

What is claimed is:

1. An optical apparatus comprising:
a lens movable in an optical axis direction;
a lens drive unit which drives the lens;
a first operating member which is operated by an operator within a predetermined movable range to generate a signal for moving the lens;
a first operating member drive unit which drives the first operating member within the predetermined movable range;
a first operating member position detector for detecting the position of the first operating member;
a second operating member which is operated to generate a signal for moving the lens; and
a controller which controls the movement of the lens and the first operating member through the lens drive unit and the first operating member drive unit, respectively;
wherein the controller controls the position of the lens in accordance with the position of the first operating member detected by the first operating member position detector in a case where the first operating member is operated, and
the controller controls the drive of the first operating member in accordance with the movement of the lens so that correspondence between the position of the first operating member and the position of the lens becomes a predetermined correspondence in a case where the lens is driven by operating the second operating member.

2. The optical apparatus according to claim 1, comprising: an optical system which comprises a variable power lens, and a focus lens as the movable lens, positioned at the image plane side of the variable power lens and performing focusing and compensation of the image plane variation that accompanies the movement of the variable power lens.

3. The optical apparatus according to claim 1, comprising: an optical system which comprises a variable power lens as the movable lens; wherein the signal from the signal output unit is a signal for moving the variable power lens in accordance with the operation of a zoom switch as the second operating member.

4. The optical apparatus according to claim 1, further comprising:
- a lens position detector for detecting the position of the lens; and
- a memory which stores information indicating the correspondence between the position of the first operating member and the position of the lens,
- wherein the controller judges, at each predetermined sampling period, whether or not the correspondence indicated by the information stored in the memory hold for the position of the first operating member detected by the first operating member position detector and the position of the lens detected by the lens position detector, and
- when the correspondence does not hold, the controller controls the drive of the lens so that the correspondence will hold for the detected position of the first operating member and the detected position of the lens.

5. The optical apparatus according to claim 1, comprising: a lens apparatus which comprises the lens; and a camera to which the lens apparatus is mounted.

6. A lens apparatus mountable to a camera, comprising: lens movable in an optical axis direction;
- a lens drive unit which drives the lens;
- a first operating member which is operated by an operator within a predetermined movable range to generate a signal for moving the lens;
- a first operating member drive unit which drives the first operating member within the predetermined movable range;
- a first operating member position detector for detecting the position of the first operating member; and
- a controller which receives a signal for moving the lens, generated by operating a second operating member provided with the camera, that is sent from the camera and controls the movement of the lens and the first operating member through the lens drive unit and the first operating member drive unit,
- wherein the controller controls the position of the lens in accordance with the position of the first operating member detected by the first operating member position detector in a case where the first operating member is operated, and
- the controller controls the drive of the operating member in accordance with the movement of the lens so that correspondence between the position of the first operating member and the position of the lens becomes a predetermined correspondence in a case where the lens is driven by operating the second operating member.

7. The lens apparatus according to claim 6, comprising: an optical system which comprises a variable power lens, and a focus lens as the movable lens, positioned at the image plane side of the variable power lens and performing focusing and compensation of the image plane variation that accompanies the movement of the variable power lens.

8. The optical apparatus according to claim 6, comprising: an optical system which comprises a variable power lens as the movable lens; wherein the signal from the camera is a signal for moving the variable power lens in accordance with the operation of a zoom switch as the second operating member.

9. The lens apparatus according to claim 6, further comprising:
- a lens position detector for detecting the position of the lens; and
- a memory which stores information indicating the correspondence between the position of the first operating member and the position of the movable lens,
- wherein the controller judges, at each predetermined sampling period, whether or not the correspondence indicated by the information stored in the memory holds for the position of the first operating member detected by the first operating member position detector and the position of the lens detected by the lens position detector, and
- when the correspondence does not hold, the controller controls the drive of the lens so that the correspondence will hold for the detected position of the first operating member and the detected position of the lens.

* * * * *

UNITED STATES PATENT AND TRADEMARK OFFICE
CERTIFICATE OF CORRECTION

PATENT NO. : 7,013,082 B2
APPLICATION NO. : 11/153627
DATED : March 14, 2006
INVENTOR(S) : Kaneda et al.

It is certified that error appears in the above-identified patent and that said Letters Patent is hereby corrected as shown below:

In col. 25, line 50, please replace "holds" with --hold--.

In col. 29, line 25, please replace "Just" with --just--.

In Claim 6 (col. 35, line 29), please replace "lens" with --a lens--.

In Claim 6 (col. 36, line 6), please replace "the operating" with --the first operating--.

In Claim 9 (col. 36, line 30), please replace "the movable lens," with --the lens,--.

Signed and Sealed this

Seventh Day of August, 2007

JON W. DUDAS
*Director of the United States Patent and Trademark Office*